US008525654B2

(12) United States Patent
Yoshizawa et al.

(10) Patent No.: US 8,525,654 B2
(45) Date of Patent: Sep. 3, 2013

(54) VEHICLE-IN-BLIND-SPOT DETECTING APPARATUS AND METHOD THEREOF

(75) Inventors: Shinichi Yoshizawa, Osaka (JP); Yoshihisa Nakatoh, Kanagawa (JP)

(73) Assignee: Panasonic Corporation, Osaka (JP)

( * ) Notice: Subject to any disclaimer, the term of this patent is extended or adjusted under 35 U.S.C. 154(b) by 754 days.

(21) Appl. No.: 12/774,060

(22) Filed: May 5, 2010

(65) Prior Publication Data

US 2010/0214086 A1    Aug. 26, 2010

Related U.S. Application Data

(63) Continuation of application No. PCT/JP2009/004648, filed on Sep. 16, 2009.

(30) Foreign Application Priority Data

Sep. 26, 2008    (JP) .................................. 2008-248919

(51) Int. Cl.
*B60Q 1/00*    (2006.01)
(52) U.S. Cl.
USPC ...... 340/435; 340/436; 340/438; 340/426.24; 340/384.73; 381/86; 701/300; 701/301
(58) Field of Classification Search
USPC ......... 340/901–903, 943, 435–438; 701/300, 701/301; 381/86
See application file for complete search history.

(56) References Cited

U.S. PATENT DOCUMENTS

| 3,158,835 | A | * | 11/1964 | Hipkins | 340/902 |
| 3,626,365 | A | * | 12/1971 | Press et al. | 367/129 |
| 3,747,057 | A | * | 7/1973 | Brougher | 367/124 |
| 3,867,719 | A | * | 2/1975 | Perrin | 340/903 |
| 4,806,931 | A | * | 2/1989 | Nelson | 340/907 |
| 4,952,931 | A | * | 8/1990 | Serageldin et al. | 340/902 |
| 6,069,961 | A | * | 5/2000 | Nakazawa | 381/92 |

(Continued)

FOREIGN PATENT DOCUMENTS

| CN | 101311034 | 11/2008 |
| JP | 5-085288 | 4/1993 |

(Continued)

OTHER PUBLICATIONS

International Search Report issued Oct. 27, 2009 in International (PCT) Application No. PCT/JP2009/004648.

*Primary Examiner* — Daniel Wu
*Assistant Examiner* — Son M Tang
(74) *Attorney, Agent, or Firm* — Wenderoth, Lind & Ponack, L.L.P.

(57) ABSTRACT

A vehicle-in-blind-spot detecting apparatus detects a vehicle positioned in a blind spot by mounting the apparatus on an operator's vehicle. The vehicle-in-blind-spot includes a presenting unit which presents information; at least one microphone which detects a sound; a vehicle sound extracting unit which extracts a vehicle sound from the sound detected by the microphone; and a sound source direction detecting unit which detects a sound source direction of the vehicle sound extracted by the vehicle sound extracting unit. A vehicle-in-blind-spot determining unit causes the presenting unit to present the information indicating that a vehicle is found in a blind spot in the case where the sound source direction of the vehicle sound detected by the sound source direction detecting unit is a first direction representing above the vehicle-in-blind-spot detecting apparatus with respect to a ground.

15 Claims, 26 Drawing Sheets

(56) References Cited

U.S. PATENT DOCUMENTS

| | | | |
|---|---|---|---|
| 6,130,949 A * | 10/2000 | Aoki et al. | 381/94.3 |
| 7,697,698 B2 * | 4/2010 | Brown | 381/86 |
| 7,969,821 B2 * | 6/2011 | Yonak | 367/129 |
| 8,111,583 B2 * | 2/2012 | Schwartz | 367/127 |
| 8,184,827 B2 * | 5/2012 | Yoshizawa et al. | 381/91 |
| 8,319,620 B2 * | 11/2012 | Usher et al. | 340/438 |
| 8,352,274 B2 * | 1/2013 | Yoshizawa et al. | 704/270 |
| 2005/0041819 A1 * | 2/2005 | Brown | 381/86 |
| 2005/0122218 A1 * | 6/2005 | Goggin | 340/552 |
| 2007/0279250 A1 | 12/2007 | Kume et al. | |
| 2009/0322559 A1 * | 12/2009 | Yen et al. | 340/901 |
| 2009/0323977 A1 * | 12/2009 | Kobayashi et al. | 381/71.8 |

FOREIGN PATENT DOCUMENTS

| | | |
|---|---|---|
| JP | 9-136573 | 5/1997 |
| JP | 2000-099853 | 4/2000 |
| JP | 2004-102579 | 4/2004 |
| JP | 2007-050724 | 3/2007 |
| JP | 2007-065832 | 3/2007 |
| JP | 2007-233770 | 9/2007 |
| JP | 2007-233864 | 9/2007 |
| JP | 2007-323556 | 12/2007 |
| JP | 2008-149917 | 7/2008 |

* cited by examiner

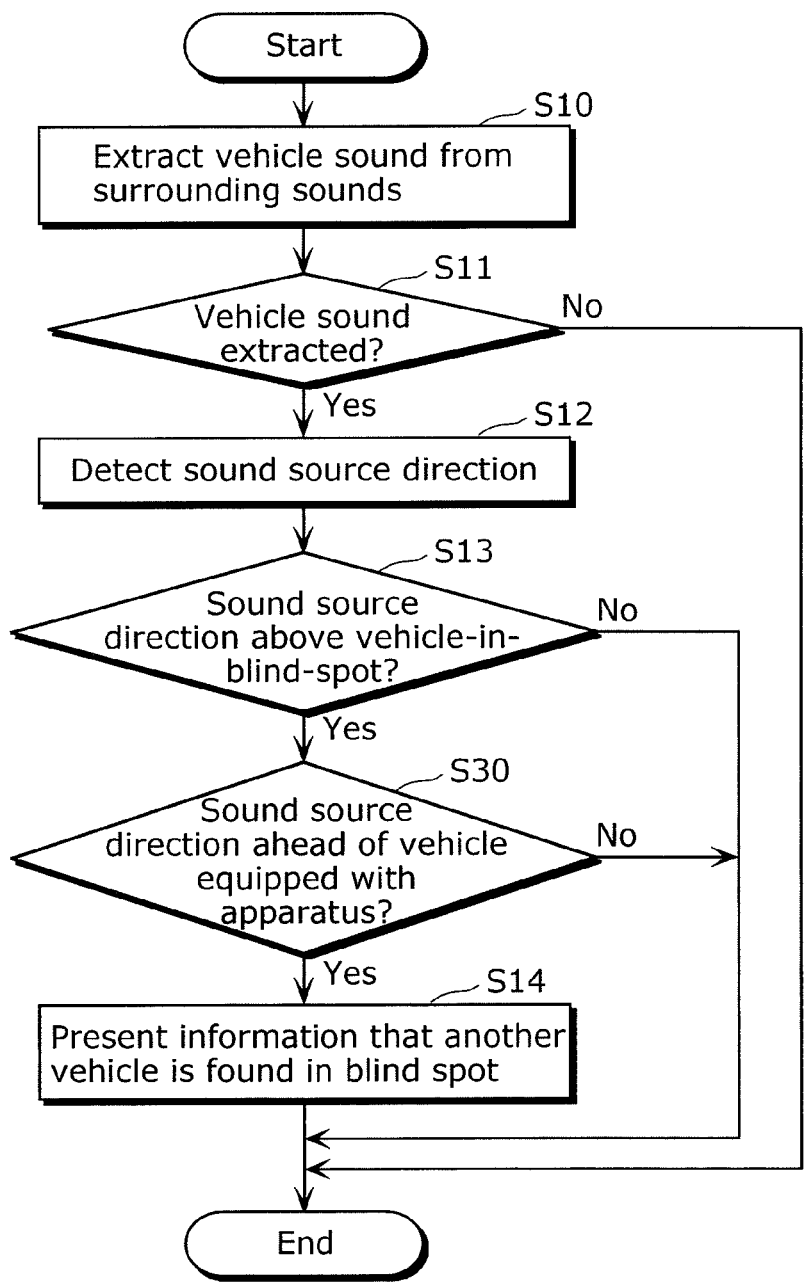

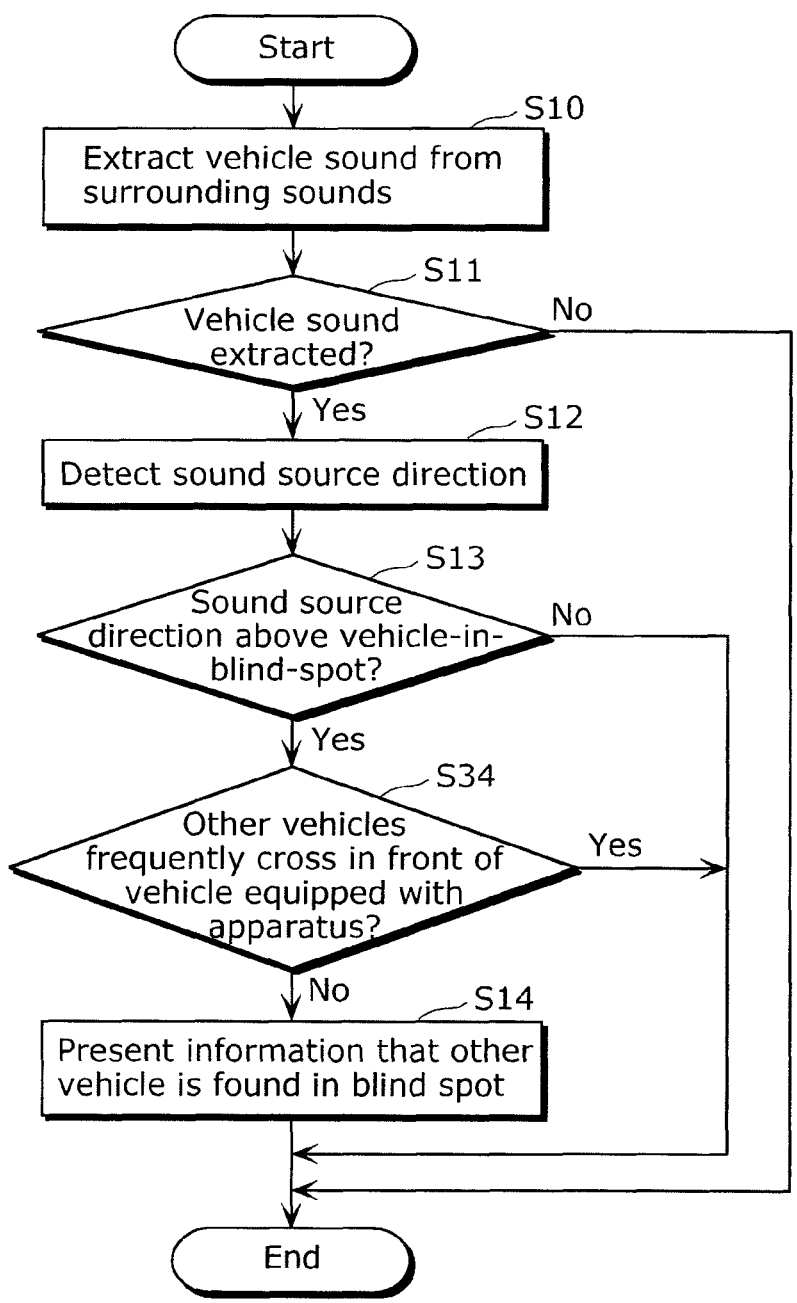

VEHICLE-IN-BLIND-SPOT DETECTING APPARATUS AND METHOD THEREOF

CROSS REFERENCE TO RELATED APPLICATION

This is a continuation application of PCT application No. PCT/JP2009/004648 filed Sep. 16, 2009 designating the United States of America.

BACKGROUND OF THE INVENTION (1) Field of the Invention

The present invention relates to an apparatus for detecting a vehicle-in-blind-spot and, in particular, to an apparatus for detecting the vehicle via sounds.

(2) Description of the Related Art

Information on blind spots is vital for a vehicle operator in order to drive safely. For safe driving, proposed have been various techniques to provide information on the blind spots to assist safe driving of the operator (See Patent Reference 1: Japanese Unexamined Patent Application Publication No. 2007-233770, Patent Reference 2: Japanese Unexamined Patent Application Publication No. 2007-323556, Patent Reference 3: Japanese Unexamined Patent Application Publication No. 2007-233864, and Patent Reference 4: Japanese Unexamined Patent Application Publication No. 2004-102579).

Patent Reference 1 proposes a technique to: determine a blind spot area out of (i) map information and (ii) a detection result, of an obstacle, obtained by radar; and present the operator the information on the determined blind spot area.

Patent Reference 2 proposes a technique to employ a communications apparatus to detect an approaching vehicle-in-blind-spot, and to give an alarm to the operator on the approaching vehicle.

Moreover, Patent Reference 3 proposes a technique to provide prioritized pieces of information on a blind spot according to a degree of hazard determined based on information obtained via communications between a roadside device and another vehicle. This technique reduces driving distractions and disturbances caused in providing the information.

In addition, Patent Reference 4, which is not designed for detecting a vehicle-in-blind-spot, proposes a technique to employ a sound to detect an approaching vehicle, and to gives an alarm to the operator on the approaching vehicle.

The technique proposed in Patent Reference 1 can detect the blind spot per se; however, the technique fails to provide the fact whether or not there is a vehicle in the blind spot area.

The techniques proposed in Patent References 2 and 3 require the other vehicle, as well as the operator's vehicle, to have the communications apparatus used for detecting the vehicle-in-blind-spot. The resulting problem is that the vehicle in the blind spot cannot be detected in the case where only the operator's vehicle is equipped with the apparatus for detecting the blind spot (the communications apparatus).

Furthermore, the technique proposed in Patent Reference 4 detects all of the approaching vehicles; however, the technique fails to determine whether or not the vehicles are in the blind spot. Accordingly, the technique gives alarms on all the approaching vehicles to the operator, which is disturbing to the operator.

SUMMARY OF THE INVENTION

The present invention is conceived in view of the above problems and has as an object to provide a vehicle-in-blind-spot detecting apparatus which can detect a vehicle positioned in a blind spot by simply mounting the apparatus on an operator's vehicle, and a method thereof.

In order to achieve the above object, a vehicle-in-blind-spot detecting apparatus, according to an aspect of the present invention, detects a vehicle positioned in a blind spot. The vehicle-in-blind-spot detecting apparatus includes: a presenting unit which presents information; at least one microphone which detects a sound a vehicle sound extracting unit which extracts a vehicle sound from the sound detected by the microphone; a sound source direction detecting unit which detects a sound source direction of the vehicle sound extracted by the vehicle sound extracting unit; and a vehicle-in-blind-spot determining unit which causes the presenting unit to present the information indicating that a vehicle is found in a blind spot in the case where the sound source direction of the vehicle sound detected by the sound source direction detecting unit is a first direction representing above the vehicle-in-blind-spot detecting apparatus with respect to a ground.

The above structure makes possible detecting the vehicle-in-blind-spot according to the direction of the vehicle sound. Thus, simply mounted on a vehicle, the vehicle-in-blind-spot detecting apparatus according to the implementation of the present invention can detect a vehicle positioned in a blind spot.

In other words, the implementation of the present invention utilizes the fact that the vehicle sound, including an engine sound and a moving sound generated by the vehicle found on the other side of the obstacle (blind area) such as a house having the second floor, arrives at the vehicle equipped with the apparatus over the roof of the obstacle with the diffraction of the sound. This allows the vehicle-in-blind-spot to be easily detected by sound.

It is noted that the present invention can be implemented as: a vehicle-in-blind-spot detecting method, a program in which the method is described, and a recording medium, such as a computer-readable CD-ROM storing the program, as well as the vehicle-in-blind-spot detecting apparatus.

The present invention makes possible realizing a vehicle-in-blind-spot detecting apparatus which can detect a vehicle positioned in a blind spot by simply mounting the apparatus on an operator's vehicle.

This apparatus can easily detect a vehicle-in-blind-spot, and notify an operator operating a vehicle of the detected vehicle. Accordingly, the operator's safe driving is assured. Thus, the present invention is significantly high in practical value.

FURTHER INFORMATION ABOUT TECHNICAL BACKGROUND TO THIS APPLICATION

The disclosure of Japanese Patent Application No. 2008-248919 filed on Sep. 26, 2008 including specification, drawings and claims is incorporated herein by reference in its entirety.

The disclosure of PCT application No. PCT/JP2009/004648 filed on Sep. 16, 2009, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 14 is a flow chart showing an operation of the vehicle-in-blind-spot detecting apparatus in accordance with Embodiment 4

FIG. 21 is a flow chart showing an operation of the vehicle-in-blind-spot detecting apparatus in accordance with Embodiment 6;

DETAILED DESCRIPTION OF THE INVENTION

Figure 1:
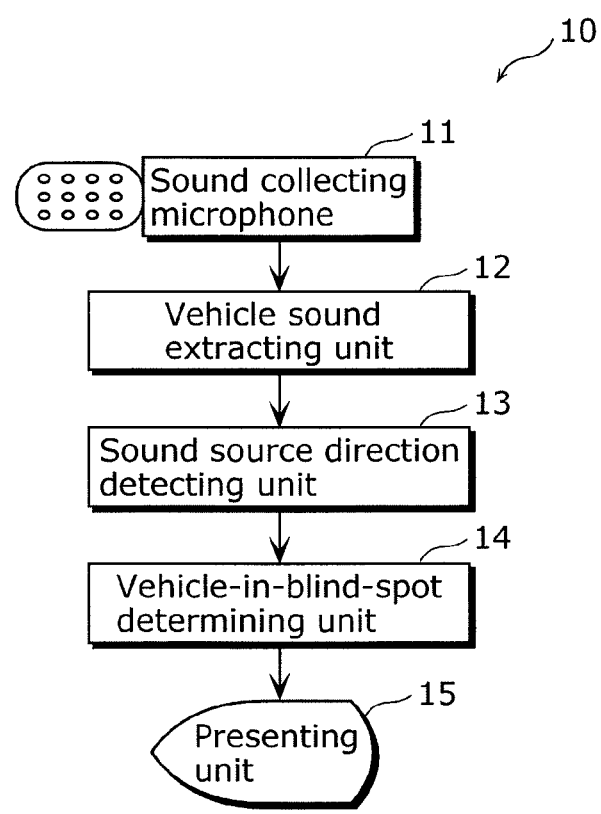
FIG. 1 is a functional block diagram illustrating a structure of a vehicle-in-blind-spot detecting apparatus in accordance with Embodiment 1 of the present invention.

A vehicle-in-blind-spot detecting apparatus according to an implementation of the present invention detects a vehicle positioned in a blind spot. The vehicle-in-blind-spot detecting apparatus includes: a presenting unit which presents information; at least one microphone which detects a sound; a vehicle sound extracting unit which extracts a vehicle sound from the sound detected by the microphone; a sound source direction detecting unit which detects a sound source direction of the vehicle sound extracted by the vehicle sound extracting unit; and a vehicle-in-blind-spot determining unit which causes the presenting unit to present the information indicating that a vehicle is found in a blind spot in the case where the sound source direction of the vehicle sound detected by the sound source direction detecting unit is a first direction representing above the vehicle-in-blind-spot detecting apparatus with respect to a ground.

The above structure makes possible detecting the vehicle-in-blind-spot according to the direction of the sound generated by the positioned vehicle. Thus, simply mounted on a vehicle, the vehicle-in-blind-spot detecting apparatus according to the implementation of the present invention can detect the vehicle positioned in a blind spot.

In the vehicle-in-blind-spot detecting apparatus according the implementation of the present invention, the vehicle-in-blind-spot determining unit further (i) determines whether or not the sound source direction of the vehicle sound has changed from the first direction to a second direction which is horizontal to the ground, and, in the case of determining that the sound source direction has changed from the first direction to the second direction, (ii) causes the presenting unit to present information for raising caution to an operator of the vehicle equipped with the vehicle-in-blind-spot detecting apparatus, the sound source direction being detected by the sound source direction detecting unit.

This structure makes possible raising caution to the operator in the case where the sound source direction of the vehicle sound has changed from above to a horizontal direction. Thus, the operator can detect in advance a risk of a possible blind-corner accident, as well as the vehicle-in-blind-spot.

In the vehicle-in-blind-spot detecting apparatus according the implementation of the present invention, the vehicle-in-blind-spot determining unit further (i) determines whether or not an intersection located toward the sound source direction has one of a blinking traffic light and a stop sign when the sound source direction has changed from the first direction to the second direction, and, in the case where the intersection located toward the sound source direction has one of the blinking traffic light and the stop sign, (ii) causes the presenting unit to present information on raising caution to the operator of the vehicle equipped with the vehicle-in-blind-spot detecting apparatus.

This structure makes possible raising caution to the operator in the case where an intersection ahead has a high risk. Thus, the operator can detect in advance a risk of a possible blind-corner accident, as well as the vehicle-in-blind-spot.

In the vehicle-in-blind-spot detecting apparatus according the implementation of the present invention, the vehicle-in-blind-spot determining unit further (i) determines whether or not the sound source direction is a direction indicating ahead of a vehicle equipped with the vehicle-in-blind-spot detecting apparatus, and, in the case where the sound source direction is the first direction and the direction indicating ahead of the vehicle, (ii) causes the presenting unit to present the information indicating that a vehicle is found in a blind spot.

This structure makes possible presenting the operator information on the vehicle-in-blind-spot in the case where the sound source direction of the vehicle sound is above and ahead. Thus, the operator can detect in advance an imminent risk of a possible blind-corner accident.

In the vehicle-in-blind-spot detecting apparatus according the implementation of the present invention, the vehicle-in-blind-spot determining unit further (i) determines whether or not the sound source direction, found ahead of a vehicle equipped with the vehicle-in-blind-spot detecting apparatus, has changed either from left to front or from right to front on the vehicle, and, in the case of determining that the sound source direction is the first direction and has changed has changed either from the left to the front or from the right to the front, (ii) causes the presenting unit to present the information indicating that a vehicle is found in a blind spot.

This structure makes possible presenting the operator information on the vehicle-in-blind-spot in the case where the sound source direction of the vehicle sound is above and has changed either from the left to the front or from the right to the front on the vehicle. Thus, the operator can detect in advance an imminent risk of a possible blind-corner accident.

In the vehicle-in-blind-spot detecting apparatus according the implementation of the present invention, the vehicle-in-blind-spot determining unit further (i) determines a predetermined number of vehicles or more have not crossed in front of the vehicle equipped with the apparatus within a predetermined time period before presenting the information, and, when the sound source direction is the first direction and the vehicle-in-blind-spot determining unit has determined that the predetermined number of vehicles or more have not crossed in front of the vehicle equipped with the apparatus within a predetermined time period, (ii) causes the presenting unit to present the information indicating that a vehicle is found in a blind spot.

This structure makes possible presenting the operator information on the vehicle-in-blind-spot in the case where (i) the sound source direction of the vehicle sound is above, and (ii) the predetermined number of vehicles or more have not crossed in front of the vehicle within a predetermined time period. Thus, the operator can detect in advance an imminent risk of a possible blind-corner accident.

The vehicle-in-blind-spot detecting apparatus according the implementation of the present invention further includes a vehicle direction specifying unit which causes the presenting unit to present information on a sound source direction horizontal to the ground as a direction at which a vehicle generating the vehicle sound is found, the sound source direction being included in the sound source direction detected by the sound source direction detecting unit.

In the case where the sound source direction detecting unit finds several sound source directions horizontal to the ground, the vehicle direction specifying unit calculates an average direction among the several sound source directions, and causes the presenting unit to present the calculated average direction as the direction at which the vehicle generating the vehicle sound has been found.

This structure makes possible presenting a direction of the vehicle found on the road according to the vehicle's sound source direction horizontal to the ground. Thus, the operator can detect in advance a direction at which the vehicle-in-blind-spot is approaching, as well as the positioned vehicle-in-blind-spot.

Described hereinafter in detail are Embodiments of a vehicle-in-blind-spot detecting apparatus in accordance with the present invention with reference to the drawings.

Embodiment 1

Described first is Embodiment 1 regarding the vehicle-in-blind-spot detecting apparatus in accordance with the present invention.

FIG. 1 is a functional block diagram illustrating a structure of a vehicle-in-blind-spot detecting apparatus 10 in accordance with Embodiment 1. Simply mounted on a vehicle, the vehicle-in-blind-spot detecting apparatus 10; namely an on-board apparatus, can detect a vehicle positioned in a blind spot. The vehicle-in-blind-spot detecting apparatus 10 includes a sound collecting microphone 11, a vehicle sound extracting unit 12, a sound source direction detecting unit 13, a vehicle-in-blind-spot determining unit 14, and a presenting unit 15. It is noted in Description that a "vehicle positioned in a blind spot" is also referred to as "vehicle-in-blind-spot". Here, the term "vehicle positioned in a blind spot" includes a vehicle at full stop, as well as a moving vehicle. The term "vehicle" also includes a two-wheel vehicle, such as a motorcycle, as well as a four-wheel vehicle.

The presenting unit 15 is a providing unit used to present information to an operator of a vehicle equipped with the apparatus. For example, the displaying unit 15 is a display unit, such as a liquid crystal display (LCD) which has a display screen and is capable of providing a voice. It is noted that the term "vehicle equipped with the apparatus" is a vehicle equipped with the vehicle-in-blind-spot detecting apparatus 10.

Figure 2:
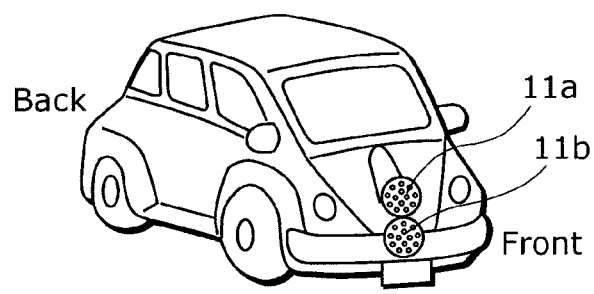
FIG. 2 illustrates a sound collecting microphone in accordance with Embodiment 1.

The sound collecting microphone 11 detects surrounding sounds. According to Embodiment 1, the sound collecting microphone 11 includes two of non-directional sound collecting microphones 11a and 11b mounted on the front (such as the inside or the outside of the hood) of the vehicle equipped with the apparatus. As shown in FIG. 2, the sound collecting microphones 11a and 11b are vertically mounted on the vehicle with a certain distance apart (20 cm, for example).

Figure 3A:
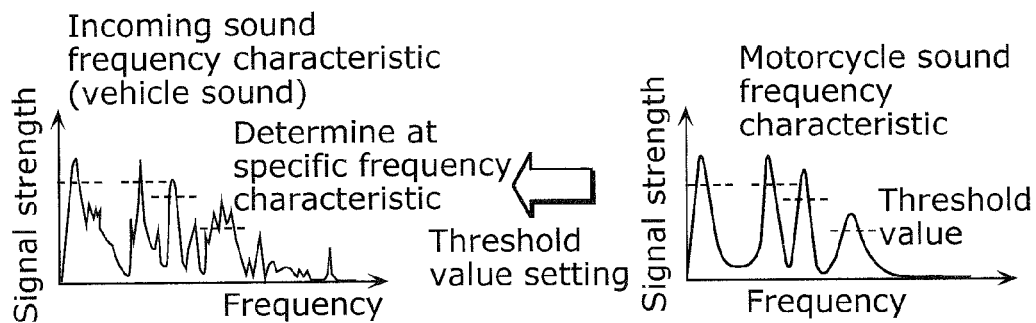
FIGS. 3 (A), (B), and (C) show three of vehicle sound extraction techniques in accordance with Embodiment 1.

The vehicle sound extracting unit 12 is a signal processing unit used for extracting a vehicle sound from surrounding sounds detected by the sound collecting microphone 11. The vehicle sound extracting unit 12 includes an AD converter and a signal processing circuit. Specifically, the vehicle sound extracting unit 12 AD-converts the sound signal provided from the sound collecting microphone 11, and frequency-analyzes the AD-converted sound signal, using the fast Fourier transformation (FFT), as shown in FIG. 3 (A). Then, the vehicle sound extracting unit 12 (i) monitors a frequency spectrum obtained via the FFT to find out whether or not a sound pressure level exceeds a predetermined threshold value, the sound pressure level being observed across predetermined all of one or more frequency bands which are unique to the vehicle sound, and (ii) extracts the vehicle sound by taking out the sound signal provided from the sound collecting microphone 11 as the vehicle sound. Here, the sound signal is taken out from the period in which the sound pressure level exceeds the predetermined threshold value.

Figure 3B:
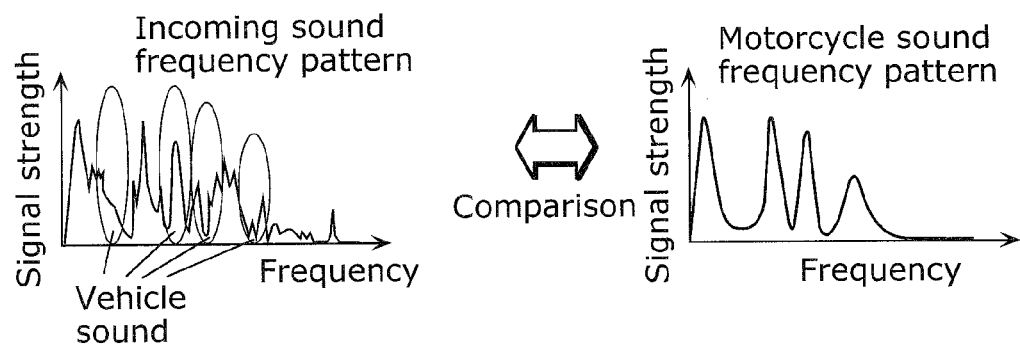

It is noted that a vehicle sound extracting technique shall not be limited to the above. For example, as shown in FIG. 3(B), the vehicle sound extracting unit 12 frequency-analyzes the sound signal provided from the sound collecting microphone 11, using the FFT. Then, the vehicle sound extracting unit 12 may (i) monitor a frequency spectrum obtained via the FFT to find out whether or not a pattern of the obtained frequency spectrum coincides with (or is similar to) that of a previously stored frequency spectrum of the vehicle sound, and (ii) extract the vehicle sound by taking out the sound signal provided from the sound collecting microphone 11 as the vehicle sound. Here, the sound signal is taken out from the period in which the both the patterns coincide. It is noted that coincidence and similarity between the frequency spectrums may be determined, for example, by (i) dividing the frequency spectrums into a certain frequency bandwidth, (ii) calculating a cumulative value of the sound pressure level (an area of the frequency spectrum) for each divided frequency spectrum, and (iii) determining whether or not the ratio between the cumulative values is observed within a certain range.

Figure 3C:
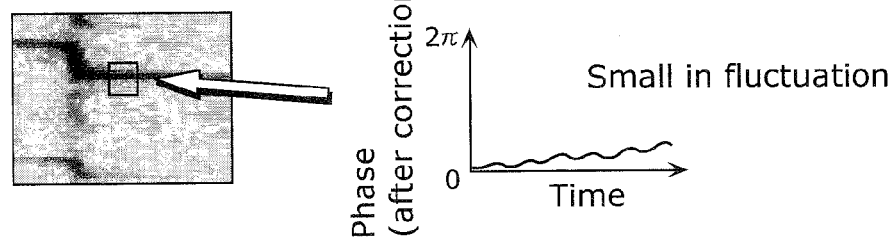

Furthermore, as another vehicle sound extracting technique, the vehicle sound extracting unit 12 takes advantage of the fact that time variation of a phase of a frequency signal of an engine sound provided from the vehicle is regularly observed between 0 to 2n (radian) at 1/f time interval (f is an analyzing frequency) at a constant angular velocity, while time variation in phase of noise is different (that is, irregularly observed). As shown in FIG. 3(C), for example, the vehicle sound extracting unit 12 may extract the vehicle sound by (i) frequency-analyzing the sound signal provided from the sound collecting microphone 11, using the FFT, (ii) monitoring a frequency spectrum obtained via the FFT to find out whether or not time variation of a phase of the obtained frequency spectrum is a certain threshold value or below, (iii) and taking out, as the vehicle sound, either: the sound signal provided from the sound collecting microphone 11 during a period in which the time variation of the phase is a certain threshold value or below; or a frequency component of which time variation of a phase is a certain threshold value or below. Here, the frequency component is included in the sound signal provided from the sound collecting microphone 11.

It is noted that regarding the sound collecting microphone 11 in which the extraction of the vehicle sound is executed, the vehicle sound extracting unit 12 may perform as follows: (1) the vehicle sound extracting unit 12 may confirm the vehicle sound, using only one of the sound collecting microphones 11a and 11b (confirming a sound pressure level in the above frequency band), and take out the sound signals provided from both of the sound collecting microphones 11a and 11b so that the sound collecting microphone 11 can provide the sound signals in the case where the vehicle sound is confirmed; (2) the vehicle sound extracting unit 12 may take out the sound signals provided from both of the sound collecting microphones 11a and 11b so that the sound collecting microphone 11 can provide the sound signals in the case where the vehicle sound is confirmed with both of the sound collecting microphones 11a and 11b; and (3) the vehicle sound extracting unit 12 may independently: confirm the vehicle sound with each of sound collecting microphones 11a and 11b; and take out the sound signal so that each of the sound collecting microphones 11a and 11b can provide the sound signal.

The sound source direction detecting unit 13 is a signal processing unit which detects a sound source direction of the vehicle sound extracted by the vehicle sound extracting unit 12. In Embodiment 1, the sound source direction detecting unit 13 calculates a between the sound pressure levels of the vehicle sounds extracted at the two sound collecting microphones 11a and 11b both vertically mounted on the vehicle equipped with the apparatus. It is noted that the ratio between the sound pressure levels of the sound collecting microphone 11a mounted above and the sound collecting microphone 11b mounted below represents the facts described below. As the ratio is closer to 1, the sound source direction is closer to a direction which is in parallel to the ground (in other words, an elevation angle with respect to the vehicle-in-blind-spot detecting apparatus 10 is 0 degree; namely, a horizontal direction). In addition, as the ratio is greater than 1, the sound source direction tends to be observed above the vehicle-in-blind-spot detecting apparatus 10 with respect to the ground (in other words, a direction of which an elevation angle with respect to the vehicle-in-blind-spot detecting apparatus 10 is greater than 0 degree).

It is noted that the detecting technique of the sound source direction is not limited to the above technique which uses the ratio between the sound pressure levels. For example, the sound source direction detecting unit 13 may calculate a phase difference between the extracted vehicle sounds (arrival time difference) with the two sound collecting microphones 11a and 11b horizontally mounted on the vehicle equipped with the apparatus. Here, the phase difference is calculated by subtracting (i) the phase of the vehicle sound extracted at the sound collecting microphone 11b mounted below from (ii) the phase of the vehicle sound extracted at the sound collecting microphone 11a mounted above. Accordingly, the sound source direction is (i) closer to the horizontal direction as the phase difference is closer to 0, and (ii) above the vehicle-in-blind-spot detecting apparatus 10 with respect to the ground as the phase difference is greater than 0.

It is noted that the "sound source direction" referred to in Description represents a nominal sound source direction for the vehicle-in-blind-spot detecting apparatus 10. In other words, the sound source direction represents a direction from which the sound travels just before the sound arrives at the vehicle-in-blind-spot detecting apparatus 10. Thus, when the vehicle sound, including an engine sound and a moving sound generated by the vehicle found on the other side of the obstacle (blind area) such as a house having the second floor, arrives at the vehicle equipped with the apparatus over the roof of the obstacle with the diffraction of the sound the sound, the source direction represents a sound source direction after the diffraction (above), not the true sound source direction (the horizontal direction in which the vehicle-in-blind-spot is found).

The vehicle-in-blind-spot determining unit 14 is a processing unit to control and cause the presenting unit 15 to present information indicating that another vehicle is found in a blind spot in the case where the sound source direction, of the vehicle sound, detected by the sound source direction detecting unit 13 is a first direction representing above the vehicle-in-blind-spot detecting apparatus 10.

Specifically, the vehicle-in-blind-spot determining unit 14 determines that "the sound source direction of the vehicle sound detected by the sound source direction detecting unit 13 is the first direction representing above the vehicle-in-blind-spot detecting apparatus 10 with respect to the ground" in the case where the ratio of the sound pressure levels calculated by the sound source direction detecting unit 13 is greater than a predetermined value (1.1, for example). When the sound source direction detecting unit calculates the phase difference, the vehicle-in-blind-spot determining unit 14 makes determination similar to the above in the case where the phase difference calculated by the sound source direction detecting unit 13 is greater than a predetermined value (three degrees, for example).

Described below is a theoretical reason why the vehicle-in-blind-spot determining unit 14 determines that a vehicle is found in the blind spot in the case where the sound source direction of the vehicle sound travels from above. The vehicle sound, including an engine sound and a moving sound generated by the vehicle placed on the other side of the obstacle (blind area) such as a house having the second floor, arrives at the vehicle equipped with the apparatus over the roof of the obstacle. In other word, when there is an obstacle between (i) the sound source of the vehicle sound and (ii) the vehicle-in-blind-spot detecting apparatus, the vehicle sound cannot arrive at the vehicle-in-blind-spot detecting apparatus in a shortest distance (the straight-line distance from the sound source of the vehicle sound to the vehicle-in-blind-spot detecting apparatus). Here, the vehicle sound is diffracted by the obstacle and arrives at the vehicle-in-blind-spot detecting apparatus. The vehicle-in-blind-spot detecting apparatus 10 in accordance with Embodiment 1 takes advantage of this principle.

It is noted that the vehicle sound extracting unit 12, the sound source direction detecting unit 13, and the vehicle-in-blind-spot determining unit 14 may be implemented in a form of either: software, using a central processing unit (CPU), a digital signal processor (DSP), a random access memory (RAM), and a random access memory storing a program; and hardware, using a dedicated electric circuit.

Described next is an operation of the vehicle-in-blind-spot detecting apparatus 10, structured above in accordance with Embodiment 1.

Figure 4:
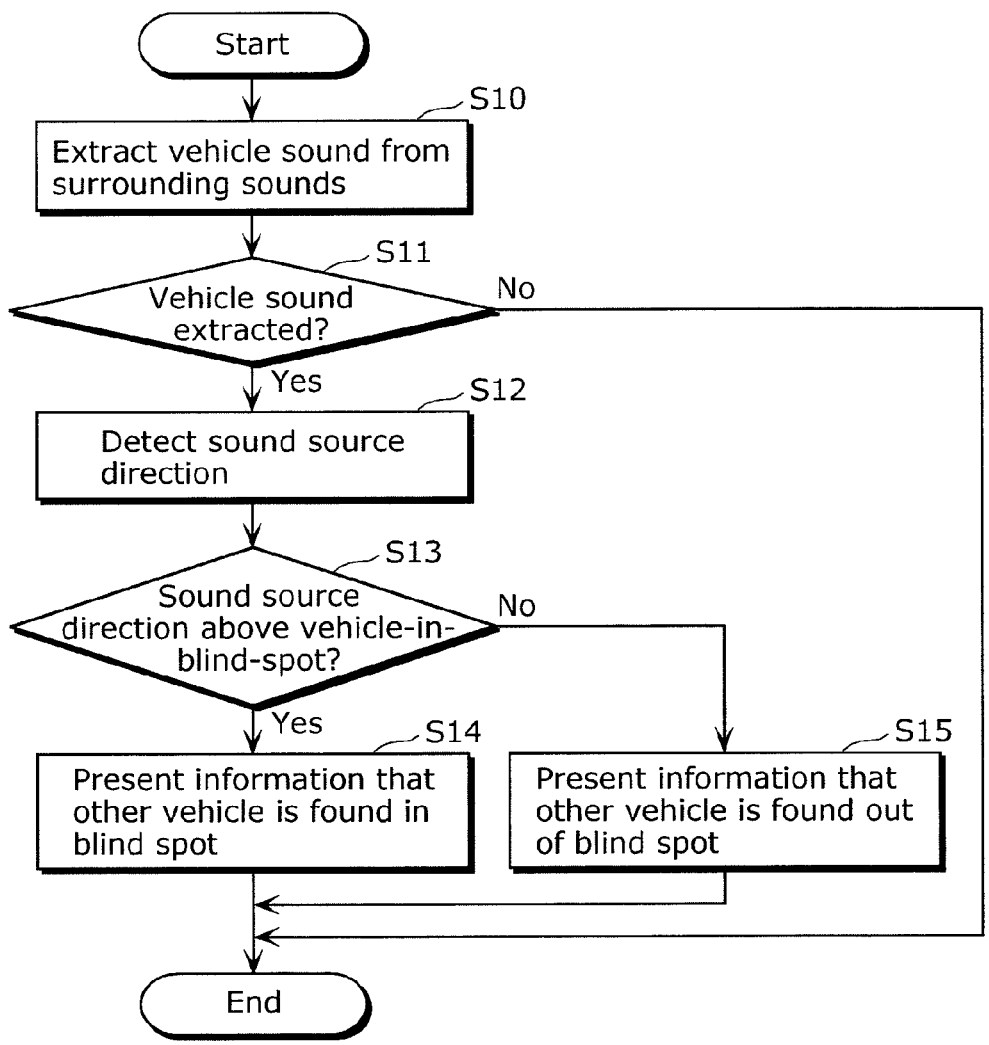
FIG. 4 is a flow chart showing an operation of the vehicle-in-blind-spot detecting apparatus in accordance with Embodiment 1.

FIG. 4 is a flow chart showing an operation in detecting the vehicle in the blind spot, using the vehicle-in-blind-spot detecting apparatus 10.

First, the vehicle sound extracting unit 12 extracts the vehicle sound from surrounding sounds detected by the sound collecting microphone 11 (S10). Here, the vehicle sound extracting unit 12 (i) AD-converts the sound signal provided from the sound collecting microphone 11, and then (ii) frequency-analyzes the AD-converted sound signal, using FFT. Then, the vehicle sound extracting unit 12 (i) monitors a frequency spectrum obtained via the FFT to find out whether or not a sound pressure level exceeds a predetermined threshold value, and (ii) determines whether or not the vehicle sound can be extracted (S11). Here, the sound pressure level is observed across predetermined all of one or more frequency bands which are unique to the vehicle sound.

As a result, in the case where the sound pressure level, observed across the predetermined all of one or more frequency bands which are unique to the vehicle sound, exceeds the predetermined threshold value (S11: Yes), the vehicle sound extracting unit 12 (i) takes out, as the vehicle sound, the sound signal provided from the sound collecting microphone 11 in the exceeding period, and (ii) provides the taken out sound signal to the sound source direction detecting unit 13. It is noted that in the case where the vehicle sound extracting unit 12 determines that the sound pressure level does not exceed the predetermined threshold value (S11: No), none of the processes described below shall be executed. Here, the sound pressure level is observed across predetermined all of one or more frequency bands which are unique to the vehicle sound.

When the vehicle sound extracted by the vehicle sound extracting unit 12 is provided to the sound source direction detecting unit 13, the sound source direction detecting unit 13 detects the sound source direction of the vehicle sound (S12). Specifically, the sound source direction detecting unit 12 calculates the ratio between the sound pressure levels of the vehicle sounds extracted at the two sound collecting microphones 11a and 11b both vertically mounted on the vehicle equipped with the apparatus. It is noted that the calculated ratio is a value corresponding to an elevation angle with respect to the vehicle-in-blind-spot detecting apparatus 10 (technically, the sound collecting microphone 11), as described above. Specifically, as the ratio is closer to 1, the sound source direction is closer to a direction which is in parallel to the ground (in other words, the elevation angle with respect to the vehicle-in-blind-spot detecting apparatus 10 is 0 degree; namely, a horizontal direction). As the ratio is greater than 1, the sound source direction tends to be observed above the vehicle-in-blind-spot detecting apparatus 10 with respect to the ground (in other words, a direction of which an elevation angle with respect to the vehicle-in-blind-spot detecting apparatus 10 is greater than 0 degree).

Then, the vehicle-in-blind-spot determining unit 14 determines whether or not the sound source direction, of the vehicle sound, obtained by the sound source direction detecting unit 13 is observed above the vehicle-in-blind-spot detecting apparatus 10 with respect to the ground (S13). Specifically, the vehicle-in-blind-spot determining unit 14 determines, for example, whether or not the ratio of the sound pressure levels calculated by the sound source direction detecting unit 13 is greater than a predetermined value (1.1, for example).

As a result, in the case where the vehicle-in-blind-spot determining unit 14 determines that the ratio of the sound pressure levels calculated by the sound source direction detecting unit 13 is greater than a predetermined value (1.1, for example) (S13: Yes), the vehicle-in-blind-spot determining unit 14 (i) determines that "the sound source direction of the vehicle sound detected by the sound source direction detecting unit 13 is a direction representing above the vehicle-in-blind-spot detecting apparatus 10 with respect to the ground", and (ii) presents the information to the presenting unit 15 that another vehicle is found in the blind spot (S14). In addition, in the case where the vehicle-in-blind-spot determining unit 14 determines that the ratio of the sound pressure levels calculated by the sound source direction detecting unit 13 is smaller than the predetermined value (S13: No), the vehicle-in-blind-spot determining unit 14 (i) determines that "the sound source direction of the vehicle sound detected by the sound source direction detecting unit 13 is not a direction representing above the vehicle-in-blind-spot detecting apparatus 10 with respect to the ground", and (ii) controls and causes the presenting unit 15 to present the information that another vehicle is found out of the blind spot (or simply, there is another vehicle) (S15).

It is noted that a presenting example of information appearing on the presenting unit 15 may be a message which reads, "Watch out for another vehicle in the blind spot" on a display monitor, or the presenting unit 15 may provide the message in a speech. The presenting unit 15 may display an image indicating a vehicle found in the blind spot at a relevant point (the blind spot) on the map, or may present any given combination of the above pieces of information.

Figure 5A:
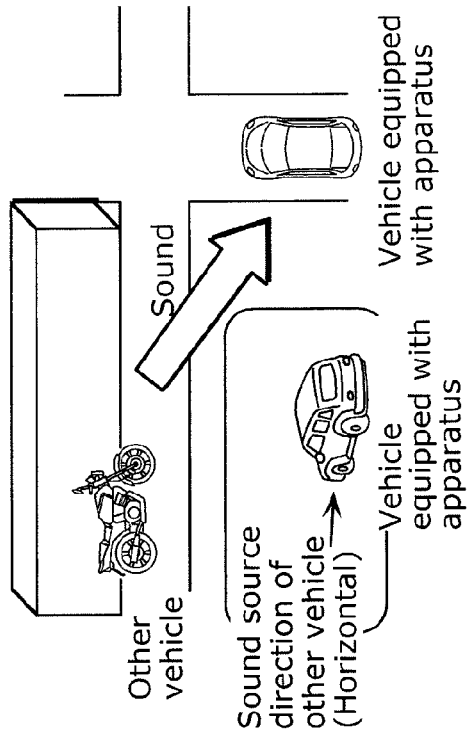
FIGS. 5 (A), (B), (C), and (D) are presenting examples provided by the vehicle-in-blind-spot detecting apparatus in accordance with Embodiment 1.
Figure 5B:
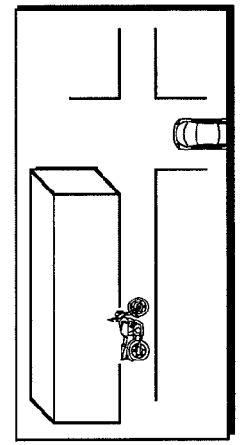
Figure 5C:
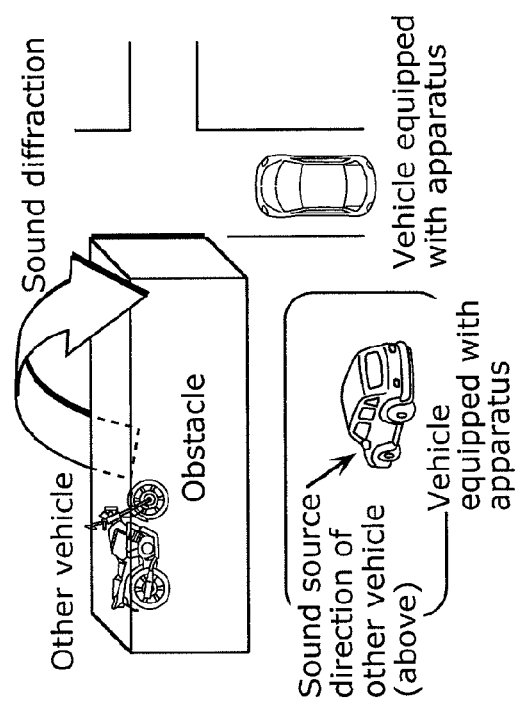
Figure 5D:
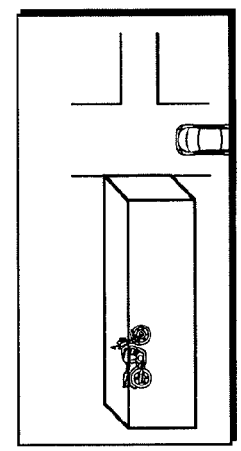

Through the above processes, the presenting unit 15 tells the operator of the vehicle equipped with the vehicle-in-blind spot detecting apparatus 10 the facts that another vehicle is found in the blind spot (here, the vehicle found in the blind spot is displayed so that the operator can see the vehicle through the obstacle) as a presenting example illustrated in FIG. 5 (B), in the case where the other vehicle is found in the blind spot as shown in a situation illustrated in FIG. 5(A). Concurrently, the operator of the vehicle equipped with the vehicle-in-blind-spot detecting apparatus 10 is notified of another vehicle found out of the blind spot (or simply the fact that the vehicle is found) via the presenting unit 15 (here, the vehicle is displayed in front of the obstacle) as a presenting example illustrated in FIG. 5 (D), in the case where the other vehicle is found out of the blind spot as shown in a situation illustrated in FIG. 5 (C).

Thus, when the vehicle-in-blind-spot detecting apparatus 10 in accordance with Embodiment 1 extracts the vehicle sound, the operator of the vehicle equipped with the apparatus can distinguish whether or not a vehicle is in a blind spot, and recognize the distinguished vehicle.

It is noted in Embodiment 1 that in the case where the vehicle-in-blind-spot determining unit 14 determines that the sound source direction of the extracted vehicle sound is not above (S13: No), the vehicle-in-blind-spot determining unit 14 causes the presenting unit 15 to present the information that another vehicle is found out of the blind spot (or simply, there is another vehicle) (S15); however, the present invention does not necessarily have the process S15. This is because the object of the present invention can be achieved as far as the operator is notified at least of the case where a vehicle is found in the blind spot (S14).

Embodiment 2

Described next is Embodiment 2 of a vehicle-in-blind-spot detecting apparatus in accordance with the present invention. In addition to the presentation of the information on the vehicle in the blind spot as described in Embodiment 1, the vehicle-in-blind-spot detecting apparatus in Embodiment 2 is characterized in detecting an approaching vehicle-in-blind-spot and raising caution to the operator.

Figure 6:
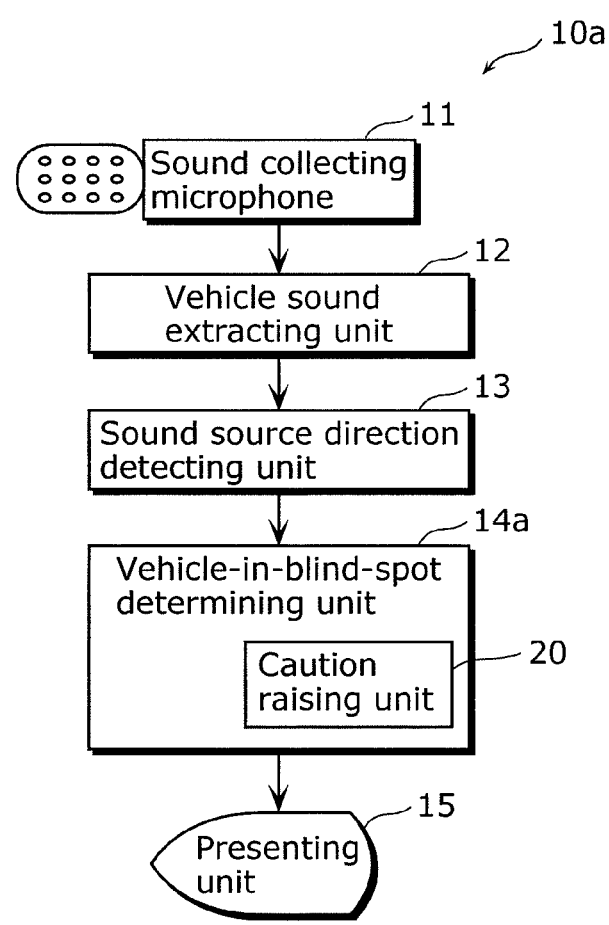
FIG. 6 is a functional block diagram illustrating a structure of a vehicle-in-blind-spot detecting apparatus in accordance with Embodiment 2 of the present invention.

FIG. 6 is a functional block diagram illustrating a structure of a vehicle-in-blind-spot detecting apparatus 10a in accordance with Embodiment 2. In addition to the functions described in Embodiment 1, the vehicle-in-blind-spot detecting apparatus 10a is capable of raising caution to the operator when the vehicle-in-blind-spot is approaching. The vehicle-in-blind-spot detecting apparatus 10a includes the sound collecting microphone 11, the vehicle sound extracting unit 12, the sound source direction detecting unit 13, a vehicle-in-blind-spot determining unit 14a, and the presenting unit 15. The structure of the vehicle-in-blind-spot detecting apparatus 10a is different from that of the vehicle-in-blind-spot detecting apparatus 10 in accordance with Embodiment 1 in replacing the vehicle-in-blind-spot determining unit 14 with the vehicle-in-blind-spot determining unit 14a having an extra function. The same structural elements as those in Embodiment 1 share the same numerical references, and thus the detailed descriptions shall be omitted.

In addition to the functions of the vehicle-in-blind-spot determining unit 14 in accordance with Embodiment 1, the vehicle-in-blind-spot determining unit 14a includes a caution raising unit 20 which raises caution to the operator.

The caution raising unit 20 is a processing unit to raise caution to the operator when the vehicle-in-blind-spot is approaching. In Embodiment 2, the caution raising unit 20 (i) determines whether or not the sound source direction changes from above (the first direction in Embodiment 1) to a horizontal direction (a second direction), and, in the case of determining the change, (ii) controls and causes the presenting unit 15 to present information used for raising caution to the operator. Here, the sound source direction of the vehicle sound is detected by the sound source direction detecting unit 13.

Specifically, when the vehicle-in-blind-spot determining unit 14a determines that the sound source direction is above, the caution raising unit 20 then determines whether or not the ratio of the sound pressure level calculated by the sound source direction detecting unit 13 is smaller than a predetermined value (1.1, for example). When determining that the ratio is smaller than the predetermined value, the caution raising unit 20 determines that "the sound source direction of the vehicle sound detected by the sound source direction detecting unit 13 has changed from above (the first direction) to the horizontal direction (the second direction)". In the case where the sound source direction detecting unit 13 calculates the phase difference, the caution raising unit 20 makes a similar determination when the phase difference calculated by the sound source direction detecting unit 13 changes from a value greater than a predetermined value (three degrees, for example) to a value smaller than the predetermined value.

Described next is an operation of the vehicle-in-blind-spot detecting apparatus 10a structured above in accordance with Embodiment 2.

Figure 7:
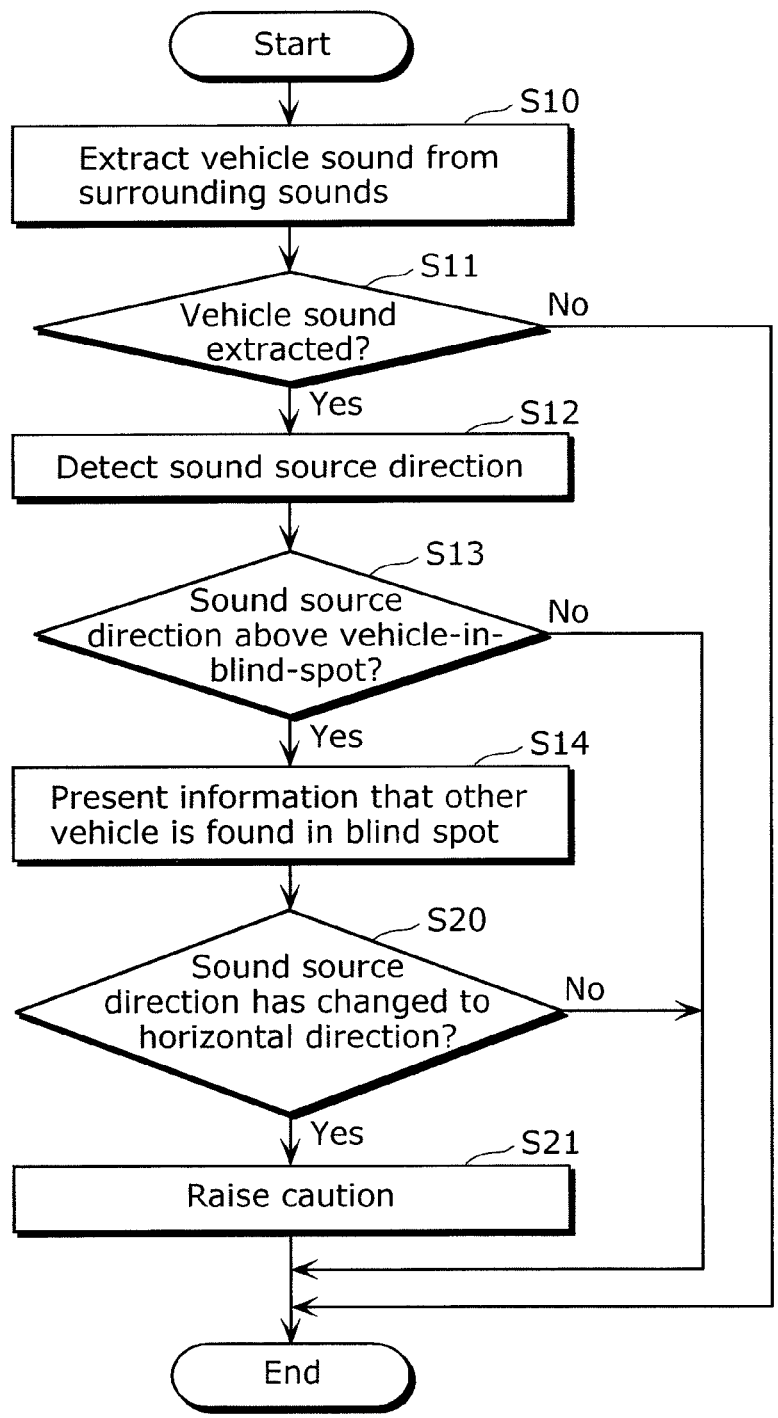
FIG. 7 is a flow chart showing an operation of the vehicle-in-blind-spot detecting apparatus in accordance with Embodiment 2.

FIG. 7 is a flow chart showing an operation in detecting the vehicle-in-blind-spot, using the vehicle-in-blind-spot detecting apparatus 10a. It is noted that the processes including the extraction of the vehicle sound (S10) through the presentation of information on the vehicle-in-blind-spot (S14) are the same as those in Embodiment 1. It is noted that the process executed by the vehicle-in-blind-spot determining unit 14 in Embodiment 1 is executed in the vehicle-in-blind-spot determining unit 14a in Embodiment 2. The same processes as those in Embodiment 1 (S10 to S14) share the same numerical references, and thus the detailed description shall be omitted.

In Embodiment 2, once the vehicle-in-blind-spot determining unit 14a finishes presenting information on the vehicle-in-blind-spot (S14), the caution raising unit 20 in the vehicle-in-blind-spot determining unit 14a determines whether or not the vehicle-in-blind-spot is approaching. In other words, the caution raising unit 20 determines whether or not the sound source direction of the vehicle sound detected by the sound source direction detecting unit 13 has changed from above (the first direction in Embodiment 1) to the horizontal direction (second direction) (S20).

Specifically, when the vehicle-in-blind-spot determining unit 14a determines that the sound source direction is above, the caution raising unit 20 then determines whether or not the ratio of the sound pressure level calculated by the sound source direction detecting unit 13 is smaller than a predetermined value (1.1, for example).

In the case where the sound source direction detecting unit 13 calculates the phase difference, the caution raising unit 20 determines whether or not the phase difference calculated by the sound source direction detecting unit 13 changes from a value greater than a predetermined value (three degrees, for example) to a value smaller than the predetermined value.

As a result, when determining that the sound source direction has changed from above to the horizontal direction (S20: Yes), the caution raising unit 20 delivers presenting unit 15 information used for raising caution to the operator (S21). The caution raising unit 20 does not deliver the information used for raising caution when determining that no change has been observed (S20: No).

It is noted that a presenting example of information for raising caution may be a message which reads, "Watch out for another vehicle in the blind spot" on a display monitor, or the message may be provided in a speech. A moving image indicating a vehicle found in the blind spot at a relevant point (the blind spot) on the map may be displayed, or any given combination of the above pieces of information may be presented.

Figure 8A:
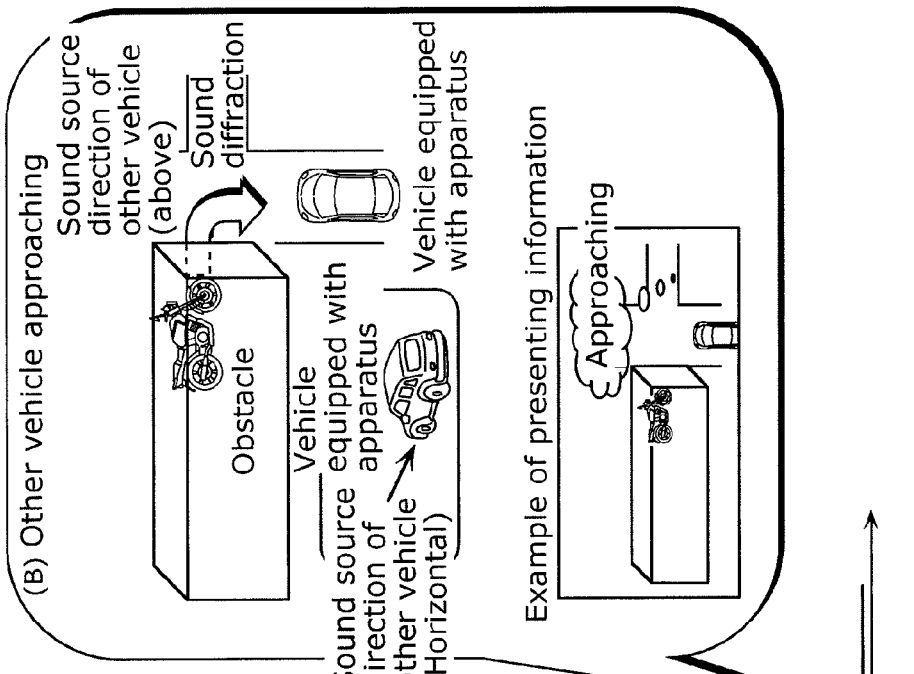
FIGS. 8 (A) and (B) are presenting examples provided by the vehicle-in-blind-spot detecting apparatus in accordance with Embodiment 2.
Figure 8B:
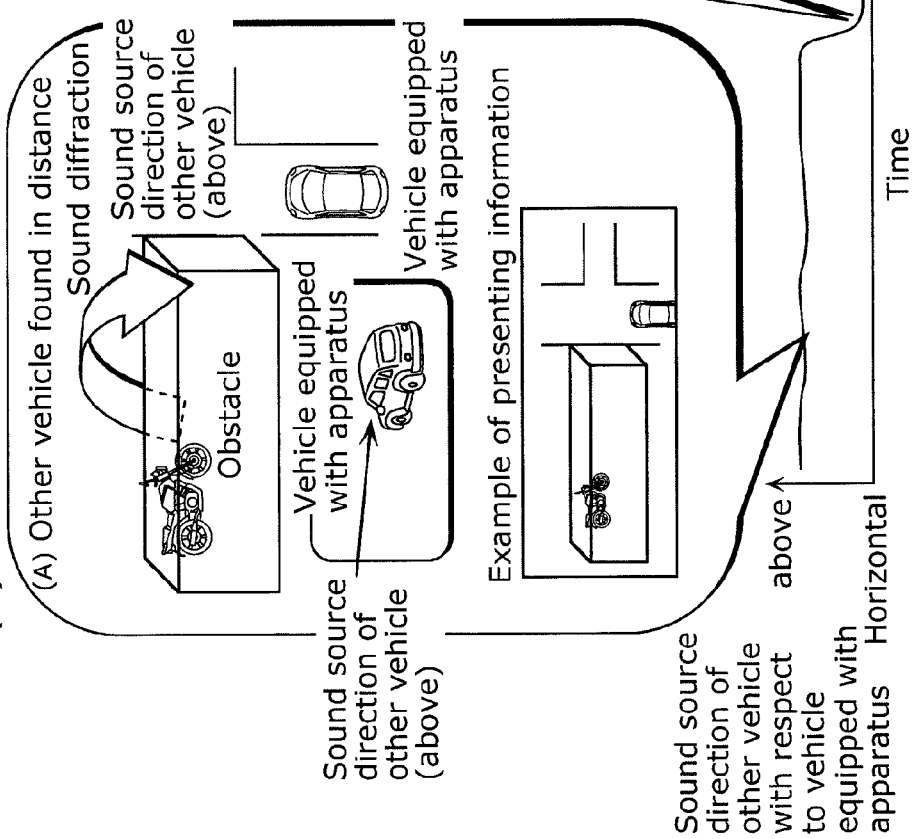

Through the above processes, the presenting unit 15 without raising particular caution tells the operator of the vehicle equipped with vehicle-in-blind-spot detecting apparatus 10a only the fact that there is a vehicle-in-blind-spot as shown in a presenting example illustrated in FIG. 8 (A) in the case where the vehicle-in-blind-spot is found in the distance as in the situation illustrated in FIG. 8 (A); that is, the case where the sound source direction continues representing above. In addition, the presenting unit 15 with raising caution (here, raising caution in a speech) tells the operator of the vehicle equipped with vehicle-in-blind-spot detecting apparatus 10a the fact in a form of a moving picture that the vehicle-in-blind-spot is approaching as shown in a presenting example illustrated in FIG. 8 (B) in the case where the vehicle-in-blind-spot is approaching the operator's vehicle as in the situation illustrated in FIG. 8 (B); that is, the case where the sound source direction has changed from above to a horizontal direction with respect to the ground.

Described below is an effect obtained by detecting the change of the sound source direction of the vehicle sound from above (first direction) to the horizontal direction (second direction). As described above, when an obstacle is found between the sound source of another vehicle and the vehicle-in-blind-spot detecting apparatus, the sound of the other vehicle is diffracted and arrives at the vehicle-in-blind-spot detecting apparatus. Comparing the cases of diffractions of the sound of the other vehicle via (i) over the obstacle with (ii) the side of the obstacle in a horizontal direction, the sound of the other vehicle traveling from the sound source to the vehicle-in-blind-spot detecting apparatus diffracts more when traveling a shorter distance.

Thus, as FIG. 8 (A) exemplifies, the sound of the other vehicle is diffracted and travels from above in the case where the distance between the other vehicle and the roof of the obstacle is shorter than that between the other vehicle and an edge of the obstacle in a horizontal direction. As the situation shown in FIG. 8 (B), concurrently, when the other vehicle is approaching, the sound of the approaching other vehicle is diffracted in the horizontal direction in the case where the distance between the other vehicle and the roof of the obstacle is longer than that between the other vehicle and the edge of the obstacle in the horizontal direction.

In other words, the vehicle-in-blind-spot detecting apparatus 10a can: detect a transition state of the other vehicle moving from a distant position to an approaching position when the other vehicle is still invisible from the vehicle equipped with the apparatus; and notify the operator of the vehicle equipped with the apparatus the situation that a special attention should be paid.

Thus, when the vehicle-in-blind-spot detecting apparatus 10a in accordance with Embodiment 2 detects the vehicle-in-blind-spot, the operator can distinguish whether or not the vehicle is approaching, and recognize the movement of the vehicle-in-blind-spot, as well as the vehicle-in-blind-spot itself.

Embodiment 3

Described next is Embodiment 3 of a vehicle-in-blind-spot detecting apparatus in accordance with the present invention. Embodiment 3 shares: with Embodiment 1 the presentation of information on the vehicle-in-blind-spot; and with Embodiment 2 the detection of the approaching vehicle-in-blind-spot to raise caution to the operator. Concurrently, Embodiment 3 is different from Embodiment 2 in a specific technique to implement a raise of the caution.

Figure 9:
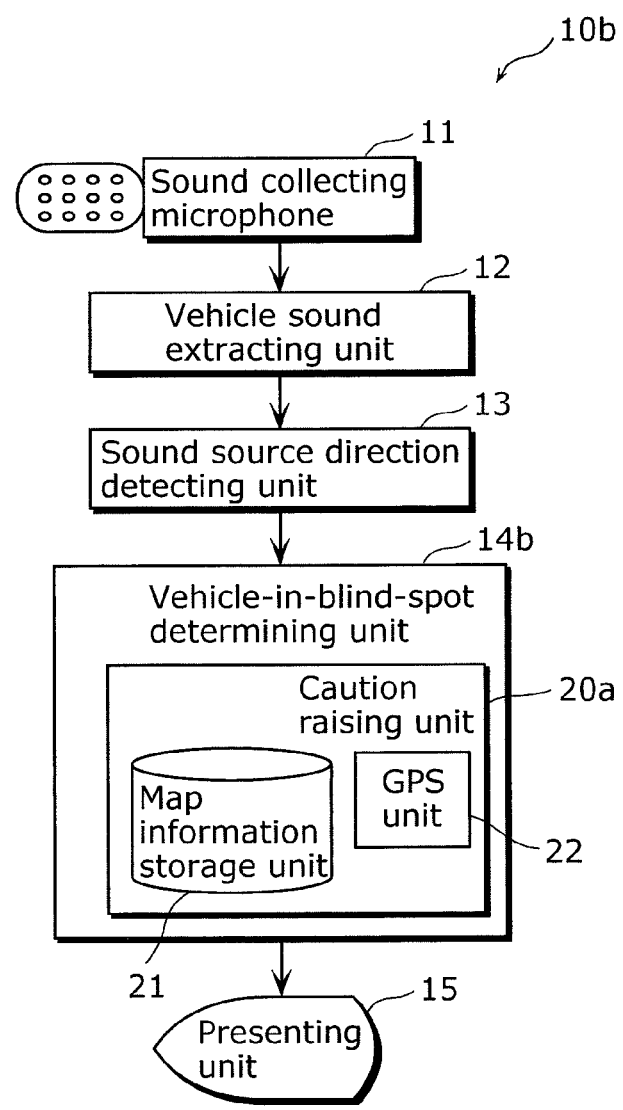
FIG. 9 is a functional block diagram illustrating a structure of a vehicle-in-blind-spot detecting apparatus in accordance with Embodiment 3 of the present invention.

FIG. 9 is a functional block diagram illustrating a structure of a vehicle-in-blind-spot detecting apparatus 10b in accordance with Embodiment 3. In addition to the functions described in Embodiment 1, the vehicle-in-blind-spot detecting apparatus 10b is capable of raising caution to the operator when the vehicle-in-blind-spot is approaching. The vehicle-in-a-blind spot detecting apparatus 10b includes the sound collecting microphone 11, the vehicle sound extracting unit 12, the sound source direction detecting unit 13, a vehicle-in-a-blind-spot determining unit 14b, and the presenting unit 15. The structure of the vehicle-in-blind-spot detecting apparatus 10b is different from that of the vehicle-in-blind-spot detecting apparatus 10 in accordance with Embodiment 1 in replacing the vehicle-in-blind-spot determining unit 14 with the vehicle-in-blind-spot determining unit 14b having an extra function. The same structural elements described in Embodiment 1 share the same numerical references, and thus the detailed descriptions shall be omitted.

In addition to the functions of the vehicle-in-blind-spot determining unit 14 in accordance with Embodiment 1, the vehicle-in-blind-spot determining unit 14b includes a caution raising unit 20a which raises caution to the operator.

The caution raising unit 20a is a processing unit to raise caution to the operator when the vehicle-in-blind-spot is approaching. In addition to the functions of the caution raising unit 20 in accordance with Embodiment 2, the caution raising unit 20a raises caution to the operator, taking an attribute of the intersection ahead into consideration.

Specifically, when the sound source direction of the vehicle sound detected by the sound source direction detecting unit 13 has changed from above (the first direction in Embodiment 1) to the direction which is in parallel to the ground (the second direction: a horizontal direction), the caution raising unit 20a: determines whether or not an intersection located toward the sound source direction has either (i) a blinking traffic light, or (ii) a stop sign; and controls and causes the presenting unit 15 to present information on raising caution to the operator in the case where the caution raising unit 20a determines that the intersection has either (i) the blinking traffic light, or (ii) the stop sign. In order to achieve the above, the caution raising unit 20a includes a map information storage unit 21 and a global positioning system (GPS) unit 22.

The map information storage unit 21 is a hard disk storing map information used for a car navigation system. The map information here includes as attributes of an intersection the facts that the intersection has: a blinking traffic light (the traffic light at the intersection is blinking); and (ii) the stop sign.

The GPS unit 22 is a GPS system used for detecting the position of the vehicle-in-blind spot detecting apparatus 10b (latitude and longitude).

Described next is an operation of the vehicle-in-blind spot detecting apparatus 10b structured above in accordance with Embodiment 3.

Figure 10:
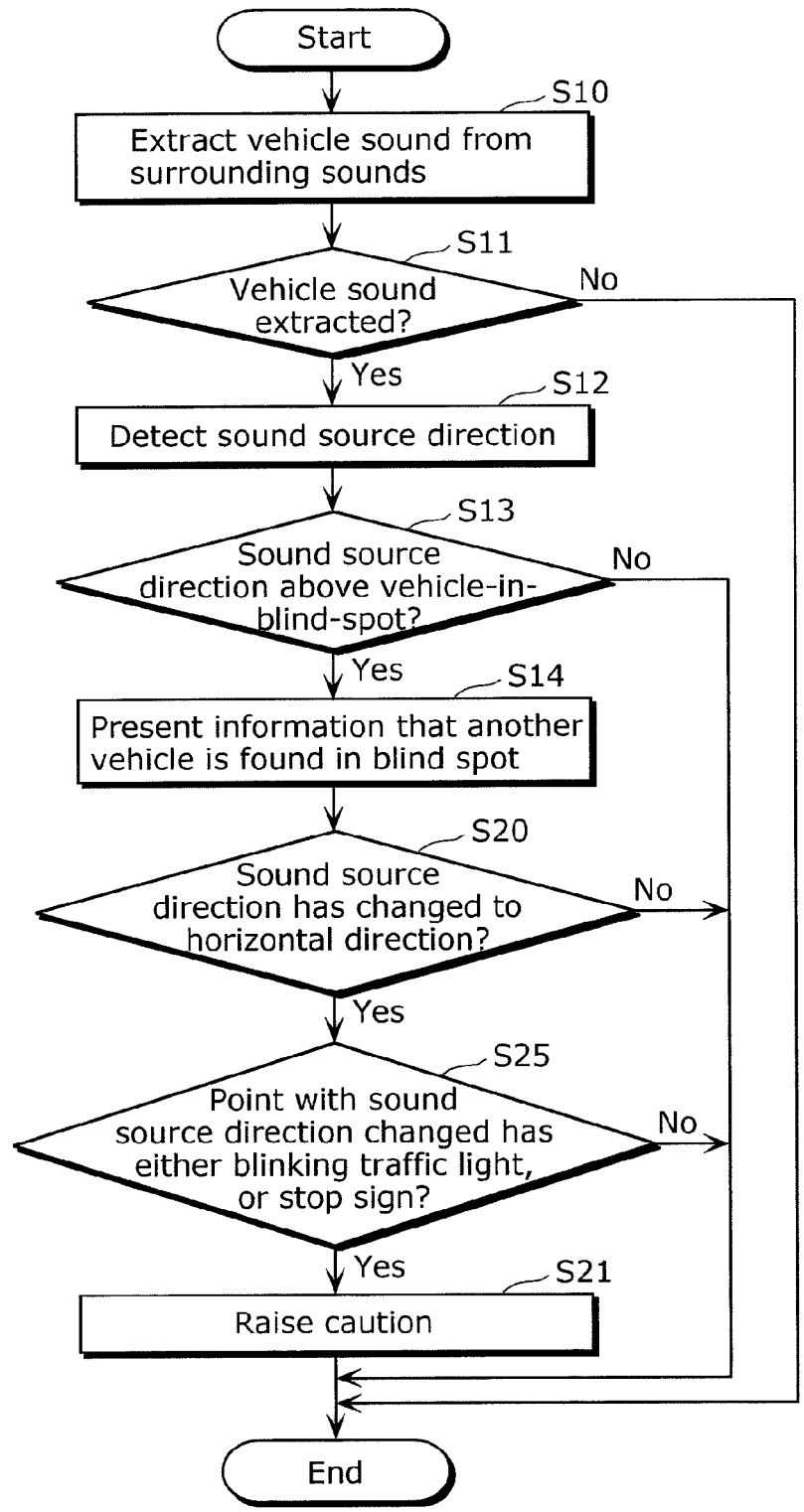
FIG. 10 is a flow chart showing an operation of the vehicle-in-blind-spot detecting apparatus in accordance with Embodiment 3.
Figure 11A:
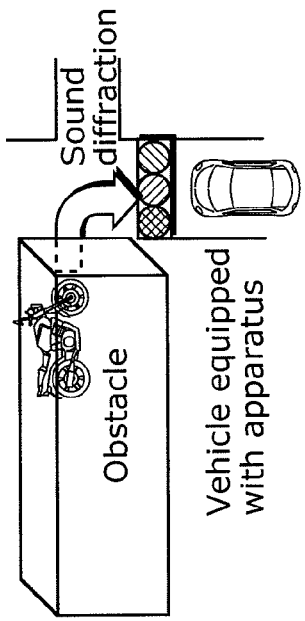
FIG. 11 (A) illustrates positioning, shown in Embodiment 3, of a vehicle-in-blind-spot and a vehicle equipped with the apparatus, FIG. 11 (B) shows a presenting example provided by the vehicle-in-blind-spot detecting apparatus, FIG. 11 (C) illustrates another positioning of the vehicle-in-blind-spot and the vehicle equipped with the apparatus, and FIG. 11 (D) shows another presenting example provided by the vehicle-in-blind-spot detecting apparatus.
Figure 11B:
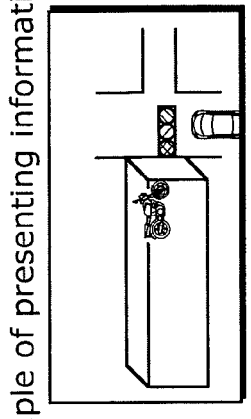
Figure 11C:
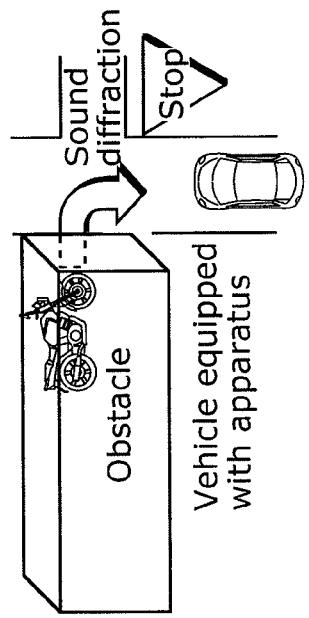
Figure 11D:
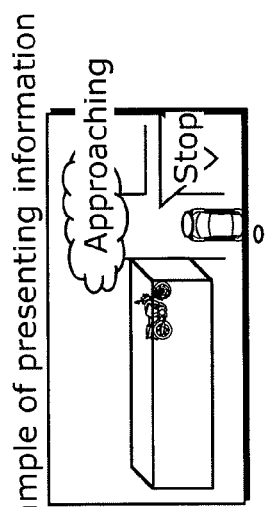

FIG. 10 is a flow chart showing an operation in detecting the vehicle in the blind spot, using the vehicle-in-blind-spot detecting apparatus 10b. The processes of extracting the vehicle sound (S10) through detecting the change of the sound source direction (the change from above to the horizontal direction) (S20) and presenting the information of raising caution (S21) are the same as those in Embodiment 2. It is noted, however, that the processes executed in Embodiment 2 by the vehicle-in-blind-spot determining unit 14a and the caution raising unit 20 are executed in Embodiment 3 by the vehicle-in-blind-spot determining unit 14b and the caution raising unit 20a. The same processes as those in Embodiment 2 (S10 to S21) share the same numerical references, and thus the detailed description shall be omitted.

In Embodiment 3, upon detecting the change of the sound source direction of the vehicle sound (the change from above to the horizontal direction), the caution raising unit 20a subsequently determines whether or not the intersection positioned toward the sound source direction has either a blinking traffic light, or a stop sign (S25). Specifically, the caution raising unit 20a uses the GPS unit 22 to (i) obtain the current position of the vehicle equipped with the apparatus at a specific time interval, and (ii) refer to the map information stored in the map information storage unit 21. Hence, the caution raising unit 20a specifies the intersection located ahead of the vehicle equipped with the apparatus and determines whether or not the intersection has either the blinking traffic light, or the stop sign.

As a result, the caution raising unit 20a presents: information used for raising caution to the operator (S21) when determining that the intersection ahead has either the blinking traffic light, or the stop sign (S25: Yes); and no such information when neither a blinking traffic light nor a stop sign is found (S25: No). It is noted that a presenting example of raising caution may be a displayed message on a display monitor which reads, "Watch out for an approaching vehicle-in-blind-spot. The intersection ahead has a blinking traffic light (or stop at the intersection ahead)". The message may also be presented in a form of a speech. In addition, displayed may be a moving image indicating the vehicle-in-blind-spot at a relevant point (the blind spot) on the map and an image indicating a blinking traffic light located at the intersection ahead (or a stop sign placed before the intersection ahead). Any given combination of the above pieces of information may also be presented.

Through the above processes, the presenting unit 15 tells the operator of the vehicle equipped with the vehicle-in-blind spot detecting apparatus 10b the fact that a vehicle-in-blind-spot is approaching and the intersection ahead has a blinking traffic light (or a stop sign is placed before the intersection ahead) as shown in a presenting example illustrated in FIG. 11 (B) in the case where the vehicle-in-blind-spot is approaching and a traffic accident possibly takes place at the blind intersection ahead as shown in FIG. 11 (A); that is, the sound source direction has changed from above to the horizontal direction, and the traffic ahead has either the blinking traffic light or the stop sign. Concurrently, the presenting unit 15 without raising particular caution (a regular traffic light is shown here) tells the operator of the vehicle equipped with vehicle-in-blind-spot detecting apparatus 10b only the fact that a vehicle-in-blind-spot is approaching as shown in a presenting example illustrated in FIG. 11 (D) in the case where even though the vehicle-in-blind-spot is approaching, a traffic accident does not likely take place at the blind intersection ahead as shown in a situation illustrated in FIG. 11 (C); that is, the sound source direction has changed from above to the horizontal direction, and the intersection ahead has no blinking traffic light or no stop sign.

Thus, when the vehicle-in-blind spot detecting apparatus 10b in Embodiment 3 detects a vehicle-in-blind-spot, the operator of the vehicle equipped with the apparatus can: distinguish whether or not (i) the vehicle-in-blind-spot is approaching, and (ii) the intersection ahead requires an attention to be paid; recognize the movement of the vehicle-in-blind-spot, as well as the vehicle-in-blind-spot itself; and realize a risk of an accident at the blind spot.

It is noted in Embodiment 3 that the caution raising unit 20a has a function to determine an attribute of an intersection in addition to the functions of the caution raising unit 20 described in Embodiment 2; however, the present invention does not necessarily have the functions of the caution raising unit 20. Specifically, when determining the fact that the sound source direction of the vehicle sound is above, the vehicle-in-blind spot detecting apparatus 10b may not determine the change of the sound source direction to the horizontal direction and may determine only the fact that the intersection ahead has either a blinking traffic light or a stop sign. In the case where such an intersection is found, the vehicle-in-blind spot detecting apparatus 10b may raise caution to the operator. As a trigger to raise caution, in other words, each of the conditions that (i) the sound source direction changes from above to the horizontal direction, and (ii) the intersection ahead has either a blinking traffic light or a stop sign may be used independently (or under OR condition). Both of the conditions may also be used (under AND condition).

Embodiment 4

Described next is Embodiment 4 of a vehicle-in-blind-spot detecting apparatus in accordance with the present invention. In addition to the confirmation made in Embodiment 1 (the sound source direction of the vehicle sound is above), Embodiment 4 is characterized in confirming the fact as a condition to present information on the vehicle-in-blind-spot that the sound source direction of the vehicle sound is ahead.

Figure 12:
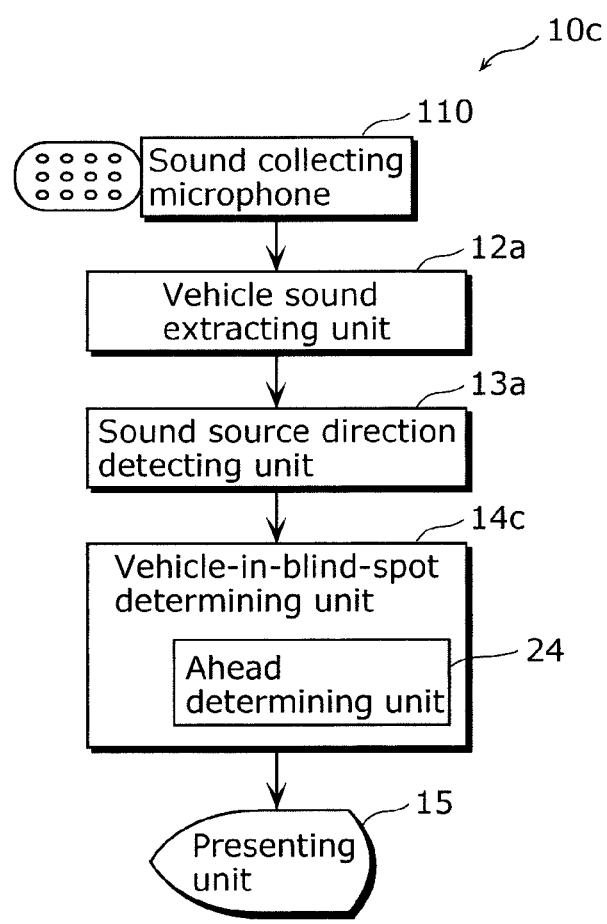
FIG. 12 is a functional block diagram illustrating a structure of a vehicle-in-blind-spot detecting apparatus in accordance with Embodiment 4 of the present invention.

FIG. 12 is a functional block diagram illustrating a structure of a vehicle-in-blind-spot detecting apparatus 10c in accordance with Embodiment 4. The vehicle-in-blind-spot detecting apparatus 10c is capable of presenting the operator information on the vehicle-in-blind-spot in the case where the sound source direction of the vehicle sound is above and ahead. The vehicle-in-blind-spot detecting apparatus 10c includes a sound collecting microphone 110, a vehicle sound extracting unit 12a, a sound source direction detecting unit 13a, a vehicle-in-a-blind-spot determining unit 14c, and the presenting unit 15. The structure of this vehicle-in-blind-spot detecting apparatus 10c is different from that of the vehicle-in-blind spot detecting apparatus 10 in accordance with Embodiment 1 in replacing the sound collecting microphone 11, the vehicle sound extracting unit 12, the sound source direction detecting unit 13, and the vehicle-in-blind-spot determining unit 14 with the sound collecting microphone 110, the vehicle sound extracting unit 12a, the sound source direction detecting unit 13a, and the vehicle-in-a-blind-spot determining unit 14c, respectively. The same structural elements described in Embodiment 1 share the same numerical references, and thus the detailed descriptions shall be omitted.

Figure 13:
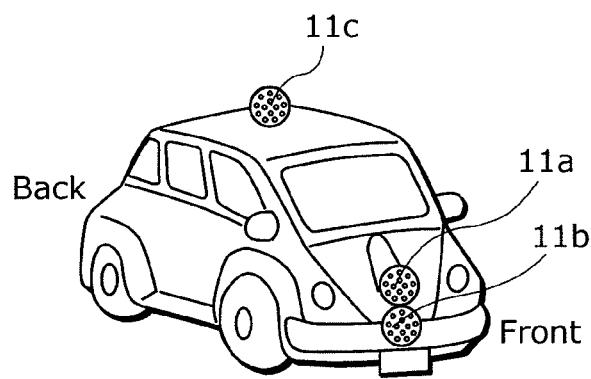
FIG. 13 illustrates a sound collecting microphone in accordance with Embodiment 4.
Figure 15C:
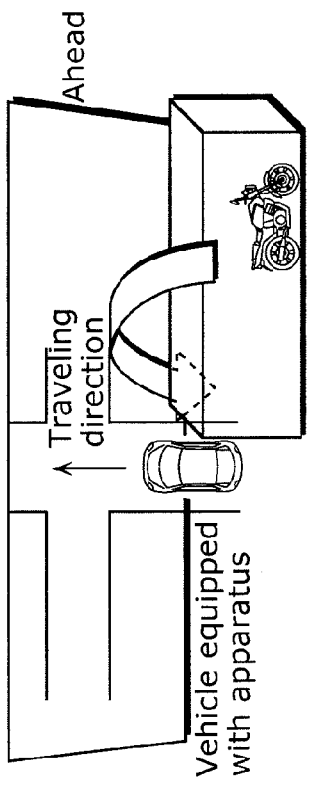
FIG. 15 (A) illustrates positioning, shown in Embodiment 4, of a vehicle-in-blind-spot and a vehicle equipped with the apparatus, FIG. 15 (B) shows a presenting example provided by the vehicle-in-blind-spot detecting apparatus, FIG. 15 (C) illustrates another positioning of the vehicle-in-blind-spot and the vehicle equipped with the apparatus, and FIG. 15 (D) shows another presenting example provided by the vehicle-in-blind-spot detecting apparatus.
Figure 15D:
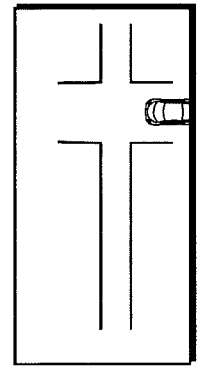
Figure 15A:
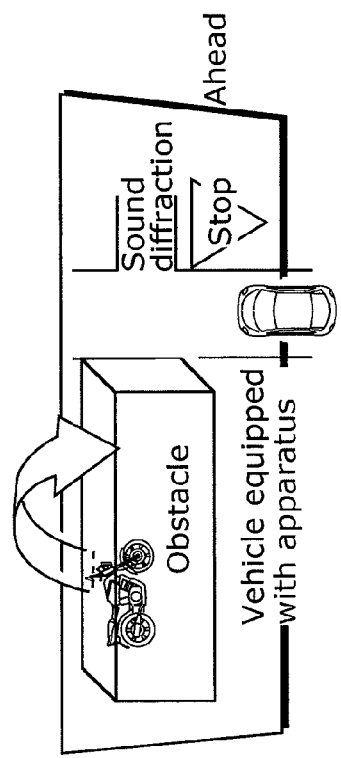
Figure 15B:
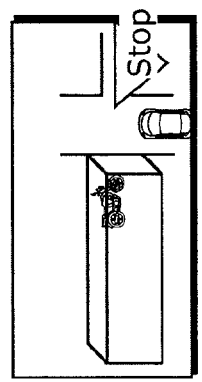

The sound collecting microphone 110; namely a microphone detecting surrounding sounds, includes three sound collecting microphones in total as shown in FIG. 13; that is, a non-directional sound collecting microphone 11c mounted on the back of the vehicle equipped with the apparatus (outside of the vehicle, such as the roof) in addition to the two sound collecting microphones 11a and 11b in accordance with Embodiment 1 both mounted on the front of the vehicle equipped with the apparatus.

The vehicle sound extracting unit 12a is a signal processing unit which extracts the vehicle sound from the surrounding sounds detected by the sound collecting microphone 110. At the sound collecting microphone 11c mounted on the back of the vehicle equipped with the apparatus, in addition to the two sound collecting microphones 11a and 11b in Embodiment 1, the vehicle sound extracting unit 12a extracts the vehicle sound, using similar processing performed at the sound collecting microphones 11a and 11b, to provide the extracted vehicle sound to the sound source direction detecting unit 13a.

The sound source direction detecting unit 13a is a signal processing unit which detects the direction of the sound source of the vehicle sound extracted by the vehicle sound extracting unit 12a.

In addition to the detection of the elevation angle direction with the two sound collecting microphones 11a and 11b in Embodiment 1, the sound source direction detecting unit 13a uses two of the microphones to detect whether or not the sound source direction of the vehicle sound is ahead (or behind), utilizing the processing similar to the detection of the elevation angle. Here, the two microphones which the sound source direction detecting unit 13a uses are (i) a sound collecting microphone mounded on the front of the vehicle equipped with the apparatus (one of the sound collecting microphones 11a and 11b), and (ii) the sound collecting microphone 11c mounted on the back of the vehicle equipped with the apparatus.

Specifically, the sound source direction detecting unit 13a calculates the ratio between the sound pressure levels (or the phase difference) of the vehicle sounds extracted at the two of the sound collecting microphones (the sound collecting microphones 11a and 11c, for example) each mounted on the front and the back of the vehicle equipped with the apparatus in order to detect whether or not the sound source direction of the vehicle sound is ahead. As the ratio between the sound pressure levels is greater than 1, the sound source direction tends to be ahead. Here, the sound pressure levels are of the sound collecting microphone 11a mounted in the front and the sound collecting microphone 11c mounted on the back. Alternatively, as the phase difference is greater than 0, the sound source direction tends to be ahead. Here, the phase difference is calculated by subtracting (i) the phase of the vehicle sound extracted at the sound collecting microphone 11c mounted on the back from (ii) the phase of the vehicle sound extracted at the sound collecting microphone 11a mounted on the front In addition to the functions of the vehicle-in-a-blind-spot determining unit 14 in accordance with Embodiment 1, the vehicle-in-a-blind-spot determining unit 14c includes an ahead determining unit 24 determining whether or not the sound source direction of the vehicle sound is ahead. Once the ahead determining unit 24 determines that the sound source direction of the vehicle sound is above (the first direction in Embodiment 1) and ahead of the vehicle equipped with the apparatus, the ahead determining unit 24 controls and causes the presenting unit 15 to present information on a vehicle found in a blind spot.

In order to determine whether or not the sound source direction of the vehicle sound is ahead, specifically, the ahead determining unit 24 employs the similar determination technique of the elevation angle direction shown in Embodiment 1 to determine whether or not the ratio of the sound pressure levels, calculated by the sound source direction detecting unit 13a, is greater than a predetermined value (1.5, for example). Here, the sound pressure levels are of the vehicle sound extracted at two of the sound collecting microphones (the sound collecting microphones 11a and 11c, for example) each mounted on the front and the back of the vehicle equipped with the apparatus. In the case where the value is greater than the predetermined value, the ahead determining unit 24 determines that the sound source direction of the vehicle sound is ahead. When the sound source direction detecting unit 13a calculates the phase difference of the vehicle sound, the ahead determining unit 24 makes the similar determination in the case where the phase difference is greater than a predetermined value (30 degrees, for example). Here, the vehicle sound is to be extracted at the two of the sound collecting microphones each mounted on the front and the back of the vehicle equipped with the apparatus (the sound collecting microphones 11a and 11c).

Described next is an operation of the vehicle-in-blind spot detecting apparatus 10c structured above in accordance with Embodiment 4.

FIG. 14 is a flow chart showing an operation in detecting the vehicle-in-blind-spot, using the vehicle-in-blind-spot detecting apparatus 10c. It is noted that the flow chart has a new step S30 inserted in the flow chart shown in Embodiment 1. The same processes as those in Embodiment 1 (S10 to S14) share the same numerical references, and thus the detailed description shall be omitted.

In Embodiment 4, upon confirming that the sound source direction of the vehicle sound is above (S13: Yes), the vehicle-in-blind-spot determining unit 14c subsequently determines whether or not the sound source direction of the vehicle sound is ahead (S30). Specifically, the ahead determining unit 24 in the vehicle-in-blind-spot determining unit 14c determines whether or not the ratio of the sound pressure levels, calculated by the sound source direction detecting unit 13a, is greater than the predetermined value (1.5, for example). Here, the sound pressure levels are of the vehicle sounds extracted at the two of the sound collecting microphones (the sound collecting microphones 11a and 11c, for example) mounted on the front and the back of the vehicle equipped with the apparatus.

As a result, the ahead determining unit 24 in the vehicle-in-blind-spot determining unit 14c determines that the sound source direction of the vehicle sound is ahead in the case where the ratio of the sound pressure levels is greater than the predetermined level (1.5, for example) (S30: Yes). Then the ahead determining unit 24 delivers presenting unit 15 information on another vehicle found in the blind spot (S14). Here, the sound pressure levels are of the vehicle sounds extracted at the two of the sound collecting microphones (the sound collecting microphones 11a and 11c, for example). The ahead determining unit 24 concurrently determines that the sound source direction of the vehicle sound is not ahead and thus delivers no information on a vehicle-in-blind-spot in the case where the ahead determining unit 24 determines that the ratio is not greater than the predetermined value (S30: No).

It is noted that a presenting example of information appearing on the presenting unit 15 may be a message which reads, "Watch out for another car in the blind spot" on a display monitor, or the presenting unit 15 may provide the message in a speech. The presenting unit 15 may display an image indicating a vehicle found in the blind spot at a relevant point (the blind spot) on the map, or may present any given combination of the above pieces of information.

Through the above processes, the presenting unit 15 tells the operator of the vehicle equipped with the vehicle-in-blind spot detecting apparatus 10*c* the fact that a vehicle-in-blind-spot is found ahead (here, the vehicle found in the blind spot is displayed so that the operator can see the vehicle through the obstacle) as shown in a presenting example illustrated in FIG. 15 (B), in the case where another car is found in the blind spot ahead as shown in a situation illustrated in FIG. 15 (A). Concurrently, the presenting unit 15 presents the operator of the vehicle equipped with the vehicle-in-blind-spot detecting apparatus 10*c* no particular information on vehicle-in-blind-spot as a presenting example illustrated in FIG. 15 (D), in the case where no vehicle-in-blind-spot is found ahead (in other words the case where either no vehicle-in-blind-spot is detected, or a vehicle-in-blind-spot is detected but the sound source direction thereof is not ahead) as shown in a situation illustrated in FIG. 15 (C).

Thus, when the vehicle-in-blind-spot detecting apparatus 10*c* in accordance with Embodiment 4 extracts the vehicle sound, the vehicle-in-blind-spot detecting apparatus 10*c* tells the operator of the vehicle equipped with the apparatus only in the case where the sound source direction of the vehicle-in-blind-spot is above and ahead; that is, a dangerous situation in which the vehicle-in-blind-spot is ahead.

It is noted in Embodiment 4 that the presenting unit 15 presents information only in the case where the sound source direction of the vehicle sound is above and ahead; concurrently, in the case where determination is made that the sound source direction of the vehicle sound is above but not ahead, the presenting unit 15 may present a message which reads, "A vehicle-in-blind-spot is nearby". Alternatively, when the sound source direction detecting unit 13*a* detects the fact that the sound source direction of the vehicle sound is above and either horizontal direction or behind, the presenting unit 15 may present information that a vehicle-in-blind-spot is found in the direction (either horizontal direction or behind).

Embodiment 5

Described next is Embodiment 5 of a vehicle-in-blind-spot detecting apparatus in accordance with the present invention. In addition to the confirmation made in Embodiment 1 (the sound source direction of the vehicle sound is above), Embodiment 5 is characterized in confirming the fact, as a condition to present information on the vehicle-in-blind-spot, that the sound source direction of the vehicle sound has changed from either the left or the right to the front.

Figure 16:
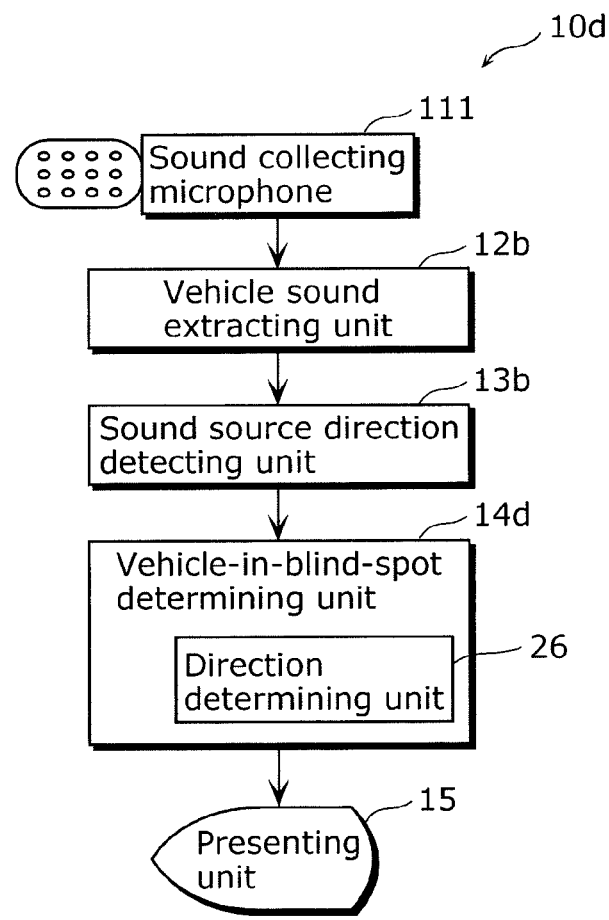
FIG. 16 is a functional block diagram illustrating a structure of a vehicle-in-blind-spot detecting apparatus in accordance with Embodiment 5 of the present invention.

FIG. 16 is a functional block diagram illustrating a structure of a vehicle-in-blind-spot detecting apparatus 10*d* in accordance with Embodiment 5. The vehicle-in-blind spot detecting apparatus 10*d* is capable of presenting information on a found vehicle-in-blind-spot to the operator of the vehicle equipped with the apparatus in the case where the sound source direction of the vehicle sound is above and changing from either the left or the right to the front. The vehicle-in-blind-spot detecting apparatus 10*d* includes a sound collecting microphone 111, a vehicle sound extracting unit 12*b*, a sound source direction detecting unit 13*b*, a vehicle-in-a-blind-spot determining unit 14*d* and the presenting unit 15. The structure of the vehicle-in-blind-spot detecting apparatus 10*d* is different from that of the vehicle-in-blind spot detecting apparatus 10 in replacing the sound collecting microphone 11, the vehicle sound extracting unit 12, the sound source direction detecting unit 13, and the vehicle-in-blind-spot determining unit 14 with the sound collecting microphone 111, the vehicle sound extracting unit 12*b*, the sound source direction detecting unit 13*b*, and the vehicle-in-blind-spot determining unit 14*d*, respectively. The same structural elements described in Embodiment 1 share the same numerical references, and thus the detailed descriptions shall be omitted.

Figure 17:
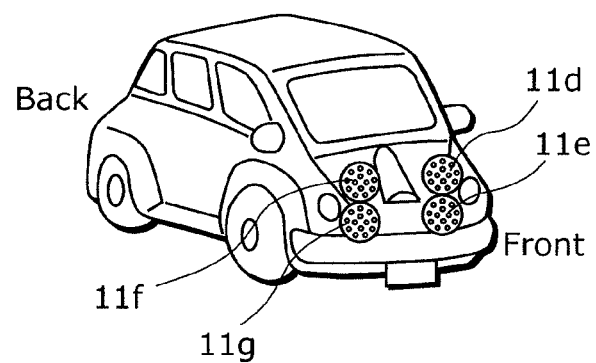
FIG. 17 illustrates a sound collecting microphone in accordance with Embodiment 5.

The sound collecting microphone 111 detects surrounding sounds. As shown in FIG. 17, the sound collecting microphone 111 includes four sound collecting microphones in total; that is, non-directional sound collecting microphones 11*d*, 11*e*, 11*f*, and 11*g*. The microphones 11*d* to 11*g* are: placed on each of the left and the right (positions near the both sides of the headlights) of the front of the vehicle (inside or outside of the hood) equipped with the apparatus; and mounted on the vehicle with a certain distance apart (20 cm, for example) in a vertical direction.

The vehicle sound extracting unit 12*b* is a signal processing unit which extracts the vehicle sound from the surrounding sounds detected by the sound collecting microphone 111. The vehicle sound extracting unit 12*b* employs the processing similar to that of the vehicle sound extracting unit 12 in Embodiment 1 to: extract the vehicle sound from the sound signals obtained at the sound collecting microphones 11*d* to 11*g*; and provide the extracted vehicle sound to the sound source direction detecting unit 13*b*. In other words, using the same technique as the vehicle sound extracting unit 12 extracts the vehicle sound at the two sound collecting microphones 11*a* and 11*b* in Embodiment 1, the vehicle sound extracting unit 12*b* extracts the vehicle sound: at a pair of microphones (the sound collecting microphones 11*d* and 11*e*) mounted to the front left; and another pair of microphones (the sound collecting microphones 11*f* and 11*g*) mounted to the front right.

The sound source direction detecting unit 13*b* is a signal processing unit which detects a direction of a sound source of the vehicle sound extracted by the vehicle sound extracting unit 12*b*. In addition to detecting the elevation angle of the sound source direction in Embodiment 1, the sound source direction detecting unit 13*b* detects whether or not the sound source direction of the vehicle sound changes from either the left or the right to the front. Here, the detection is conducted at each of: the pair of the microphones (the sound collecting microphones 11*d* and 11*e*) mounted to the front left; and the other pair of the microphones (the sound collecting microphones 11*f* and 11*g*) mounted to the front right.

In order to detect whether or not the sound source direction of the vehicle sound is changing from either the left or the right to the front, specifically, the sound source direction detecting unit 13*b* calculates the time variation of the ratio between the sound pressure levels (or the phase difference) of the vehicle sound extracted at two of the sound collecting microphones (the sound collecting microphones 11*d* and 11*f*, for example) mounted each of the front left and the front right of the vehicle equipped with the apparatus. In the case where the ratio between the sound pressure levels are approaching 1 with time, the sound source direction tends to be changing from either the left or the right to the front. Here, the sound pressure levels are of (i) the sound collecting microphone lid mounted on the front left, and (ii) the sound collecting microphone 11*f* mounted on the front right. Alternatively, in the case where the phase difference is approaching 0 with time, the sound source direction tends to be changing from either the left or the right to the front. Here, the phase difference is calculated by subtracting (i) the phase of the vehicle sound extracted at the sound collecting microphone 11*f* mounted to the front right from (ii) the phase of the vehicle sound extracted at the sound collecting microphone 11*d* mounted to the front left.

In addition to the functions of the vehicle-in-blind-spot determining unit 14 in accordance with Embodiment 1, the vehicle-in-blind-spot determining unit 14*d* includes a direction determining unit 26 determining whether or not the sound source direction of the vehicle sound is changing from either the left or the right to the front. For example, the direction determining unit 26 controls and causes the presenting unit 15 to present information that a vehicle is found in the blind spot in the case where the direction determining unit 26 determines that the sound source direction of the vehicle sound is (i) above (the first direction in Embodiment 1 and (ii) changing from either the left or the right to the front.

In order to determine whether or not the sound source direction of the vehicle sound is changing from either the left or the right to the front, specifically, the direction determining unit 26 determines whether or not the ratio of the sound pressure levels of the vehicle sound is approaching 1, and, when approaching to 1, determines that the sound source direction of the vehicle sound is changing from either the left or the right to the front. Here, the vehicle sound is extracted at two of the sound collecting microphones (the sound collecting microphones 11*d* and 11*f*, for example) mounted on each of the front left and the front right of the vehicle equipped with the apparatus. When the sound source direction detecting unit 13*b* calculates the phase difference of the vehicle sound, the direction determining unit 26 makes the determination similar to the above in the case where the phase difference is approaching 0 with time. Here, the vehicle sound is extracted at two of the sound collecting microphones (the sound collecting microphones 11*d* and 11*f*, for example) mounted on each of the front left and the front right of the vehicle equipped with the apparatus.

Described next is an operation of the vehicle-in-blind spot detecting apparatus 10*d* structured above in accordance with Embodiment 5.

Figure 18:
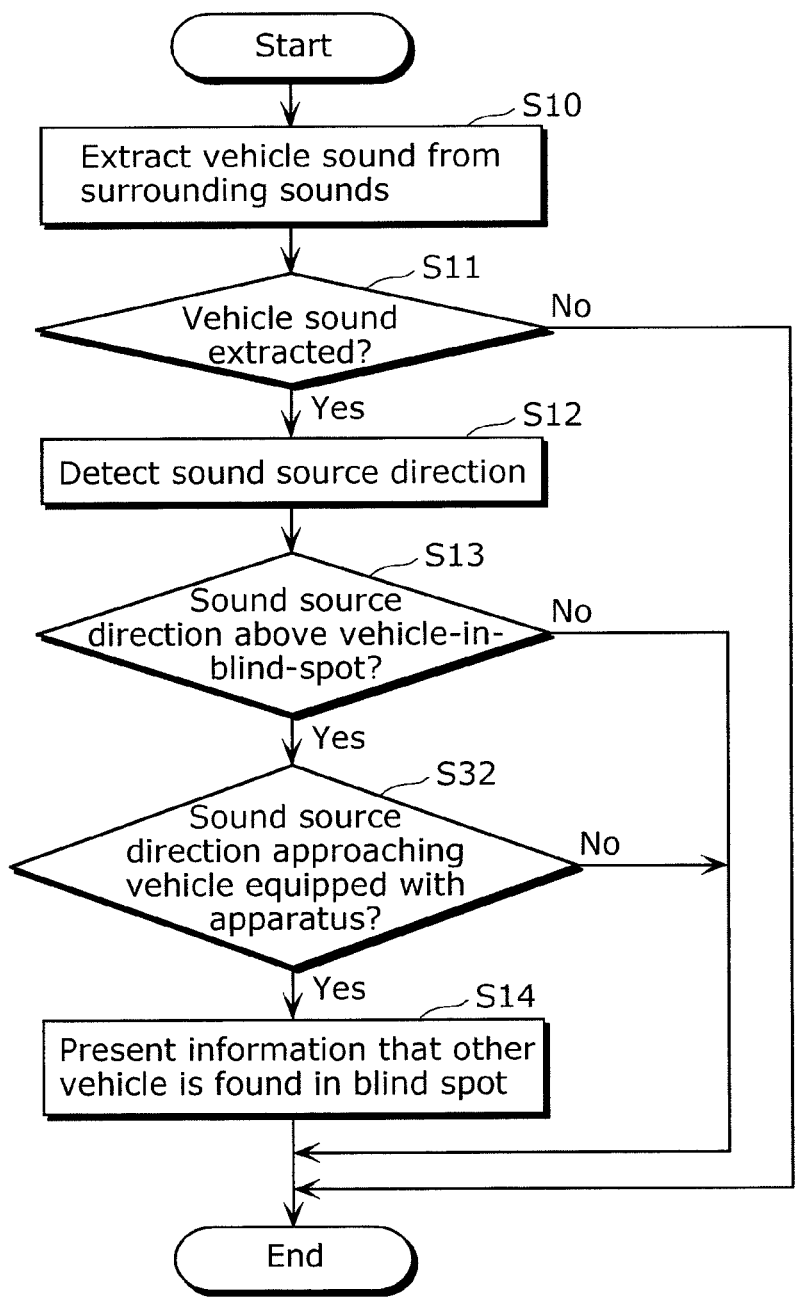
FIG. 18 is a flow chart showing an operation of the vehicle-in-blind-spot detecting apparatus in accordance with Embodiment 5.
Figure 19C:
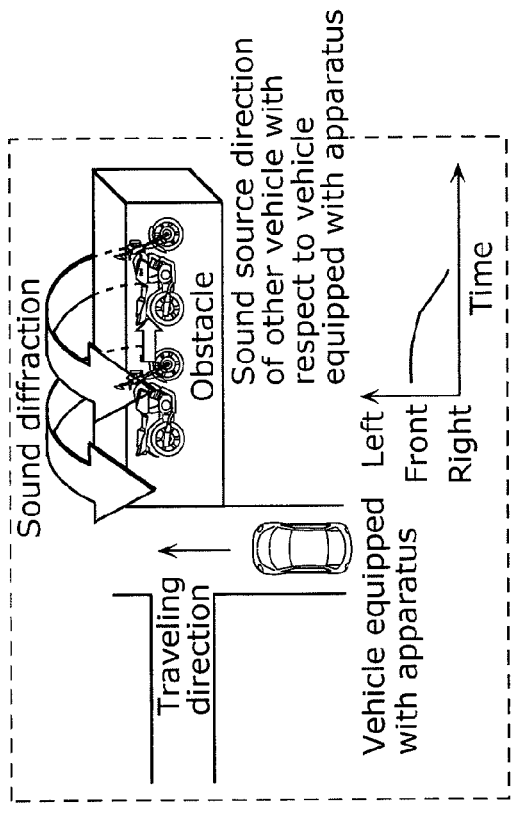
FIG. 19 (A) illustrates positioning, shown in Embodiment 5, of a vehicle-in-blind-spot and a vehicle equipped with the apparatus, FIG. 19 (B) shows a presenting example provided by the vehicle-in-blind-spot detecting apparatus, FIG. 19 (C) illustrates another positioning of the vehicle-in-blind-spot and the vehicle equipped with the apparatus, and FIG. 19 (D) shows another presenting example provided by the vehicle-in-blind-spot detecting apparatus.
Figure 19D:
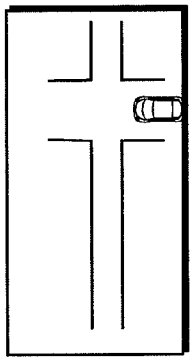
Figure 19A:
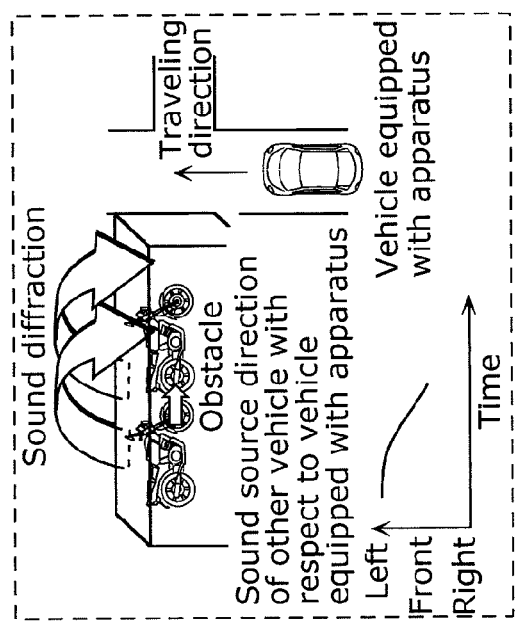
Figure 19B:
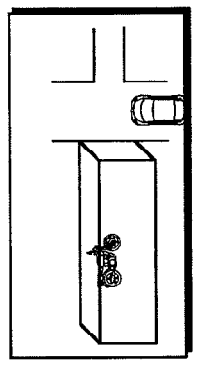

FIG. 18 is a flow chart showing an operation in detecting the vehicle in the blind spot, using the vehicle-in-blind-spot detecting apparatus 10*d*. It is noted that the flow chart has a new step S32 inserted in the flow chart shown in Embodiment 1. The same processes as those in Embodiment 1 (S10 to S14) share the same numerical references, and thus the detailed description shall be omitted.

In Embodiment 5, upon confirming that the sound source direction of the vehicle sound is above (513: Yes), the vehicle-in-blind-spot determining unit 14*d* subsequently determines whether or not the sound source direction of the vehicle sound is changing from either the left or the right to the front (S32). Specifically, the direction determining unit 26 in the vehicle-in-blind-spot determining unit 14*d* determines whether or not the ratio of the sound pressure levels of the vehicle sound is approaching 1 with time. Here, the vehicle sound is extracted at two of the sound collecting microphones (the sound collecting microphones 11*d* and 11*f*, for example) mounted to each of the front left and the front right of the vehicle equipped with the apparatus.

As a result, when the direction determining unit 26 in the vehicle-in-blind-spot determining unit 14*d* determines that the ratio of the sound pressure levels of the vehicle sound is approaching 1 with time (S32: Yes), the direction determining unit 26: determines that the sound source direction of the vehicle sound is changing from the left or the right to the front; and delivers information to the presenting unit 15 that another vehicle is found in the blind spot (S14). When determining that the ratio is not approaching to 1 (S32: No), the direction determining unit 26: determines that observed is no change of the sound source direction of the vehicle sound from either the left or the right to the front; and delivers no information on a vehicle-in-blind-spot. Here, the vehicle sound is extracted at two of the sound collecting microphones (the sound collecting microphones 11*d* and 11*f*, for example) mounted to each of the front left and the front right of the vehicle equipped with the apparatus.

It is noted that, as a presenting example to the presenting unit 15, a message which reads, "Watch out for an approaching vehicle-in-blind-spot from the left (or the right) toward the front" may be displayed. The massage may also be presented in a speech. In addition, the presenting unit 15 may display an image indicating that a vehicle-in-blind-spot, found at a relevant point (the blind intersection ahead) on the map, is approaching from the left (or the right) toward the front, or may present any given combination of the messages.

Through the above processes, the presenting unit 15 tells the operator of the vehicle equipped with the vehicle-in-blind spot detecting apparatus 10*d* the fact that a vehicle-in-blind-spot is approaching from the left (or the right) to the front (here, a moving picture is presented so that the operator of the vehicle equipped with the apparatus can see the approaching vehicle-in-blind spot through the obstacle) as shown in a presenting example illustrated in FIG. 19 (B), in the case where the vehicle-in-blind spot is approaching from the left (or the right) to the front as shown in a situation illustrated in FIG. 19 (A). Concurrently, the presenting unit 15 presents no particular information on a vehicle-in-blind-spot as a presenting example illustrated in FIG. 19 (D), in the case where no vehicle-in-blind-spot is approaching from the left (or the right) to the front (in other words, the cases where (i) no vehicle-in-blind-spot is detected, and (ii) the detected vehicle-in-blind-spot has been detected but stopped or is moving from the front to the left (or right)) as shown in a situation illustrated in FIG. 15 (D).

Thus, in extracting the vehicle sound, the vehicle-in-blind-spot detecting apparatus 10*d* in accordance with Embodiment 5 tells the operator of the vehicle equipped with the apparatus a found vehicle-in-blind-spot only in the case where the sound source direction of the vehicle-in-blind-spot is above and changing from the left or the right to the front; that is, a dangerous situation in which the vehicle-in-blind-spot is approaching the front.

It is noted in Embodiment 5 that the presenting unit 15 presents information only in the case where the sound source direction of the vehicle sound is above and changing from the left or the right to the front; concurrently, in the case where determination is made that the sound source direction of the vehicle sound is above but not changing from the left or the right to the front, the presenting unit 15 may present an information which reads, "A vehicle-in-blind-spot is nearby".

Embodiment 6

Described next is Embodiment 6 of a vehicle-in-blind-spot detecting apparatus in accordance with the present invention. In addition to the confirmation made in Embodiment 1 (the sound source direction of the vehicle sound is above), Embodiment 6 is characterized in confirming the fact, as a condition to present information on the vehicle-in-blind-spot, that the predetermined number of vehicles or more have not crossed in front of the vehicle equipped with the apparatus within a predetermined time period before presenting information on a vehicle-in-blind spot; that is there is a possible risk of a traffic accident at a lightly-trafficked blind intersection.

Figure 20:
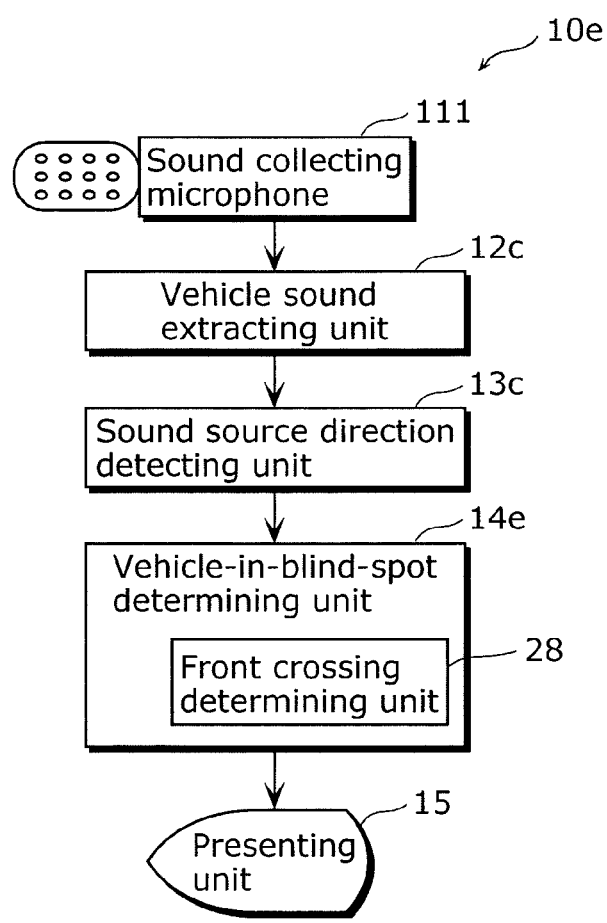
FIG. 20 is a functional block diagram illustrating a structure of a vehicle-in-blind-spot detecting apparatus in accordance with Embodiment 6 of the present invention.
Figure 22C:
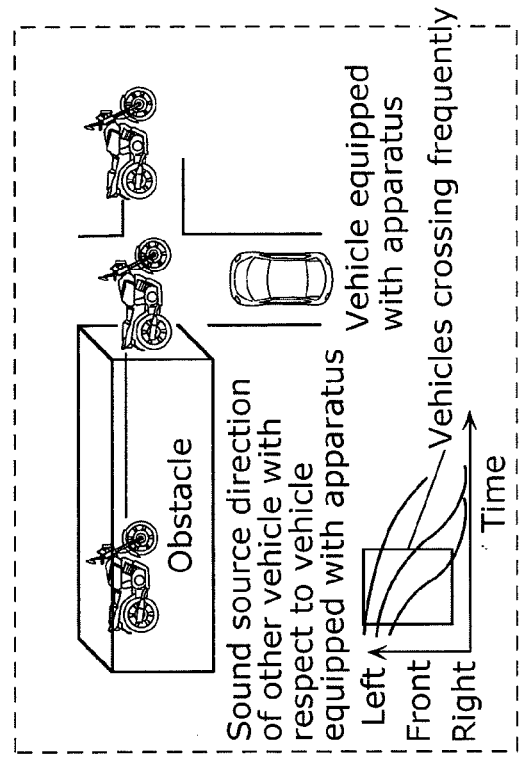
FIG. 22 (A) illustrates positioning, shown in Embodiment 6, of a vehicle-in-blind-spot and a vehicle equipped with the apparatus, FIG. 22 (B) shows a presenting example provided by the vehicle-in-blind-spot detecting apparatus, FIG. 22 (C) illustrates another positioning of the vehicle-in-blind-spot and the vehicle equipped with the apparatus, and FIG. 22 (D) shows another presenting example provided by the vehicle-in-blind-spot detecting apparatus.
Figure 22D:
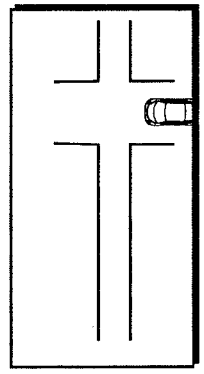
Figure 22A:
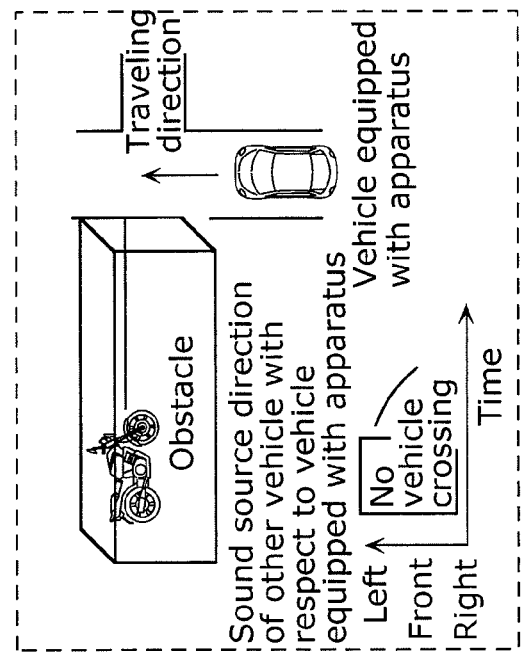
Figure 22B:
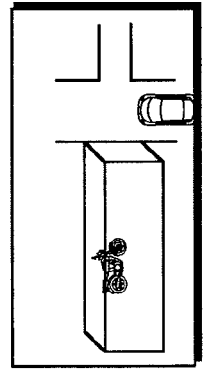

FIG. 20 is a functional block diagram illustrating a structure of a vehicle-in-blind-spot detecting apparatus 10e in accordance with Embodiment 6. The vehicle-in-blind-spot detecting apparatus 10e is capable of presenting information on a found vehicle-in-blind-spot to the operator of the vehicle equipped with the apparatus in the cases where (i) the sound source direction of the vehicle sound is above, and (ii) the predetermined number of vehicles or more have not crossed in front of the vehicle equipped with the apparatus within a predetermined time period before presenting information on a vehicle-in-blind-spot. The vehicle-in-blind spot detecting apparatus 10e includes the sound collecting microphone 111, a vehicle sound extracting unit 12c, a sound source direction detecting unit 13c, a vehicle-in-blind-spot determining unit 14e, and the presenting unit 15. The structure of this vehicle-in-blind-spot detecting apparatus 10e is different from that of the vehicle-in-blind spot detecting apparatus 10 in accordance with Embodiment 1 in replacing the sound collecting microphone 11, the vehicle sound extracting unit 12, the sound source direction detecting unit 13, and the vehicle-in-blind-spot determining unit 14 with the sound collecting microphone 111, the vehicle sound extracting unit 12c, the sound source direction detecting unit 13c, and the vehicle-in-blind-spot determining unit 14e, respectively. The same structural elements described in Embodiment 1 share the same numerical references, and thus the detailed descriptions shall be omitted.

The sound collecting microphone 111 is the same as that shown in Embodiment 5 and detects surrounding sounds. In other words, the sound collecting microphone 111 includes two pairs of non-directional sound collecting microphones placed on each of the front left and the front right of the vehicle equipped with the apparatus. Each pair of the microphones (a pair of the sound collecting microphones (the sound collecting microphones 11d and 11e both mounted on the front right) and another pair of the sound collecting microphones (the sound collecting microphones 11f and 11g both mounted on the front left) is mounted on the vehicle with a certain distance apart in a vertical direction.

The vehicle sound extracting unit 12b, which is the same as that shown in Embodiment 5, is a signal processing unit which extracts the vehicle sound from the surrounding sounds detected by the sound collecting microphone 111. In other words, the vehicle sound extracting unit 12b employs the processing similar to that of the vehicle sound extracting unit 12 in Embodiment 1 to: extract the vehicle sound from the sound signals obtained at the sound collecting microphones 11d to 11g; and provide the extracted vehicle sound to the sound source direction detecting unit 13c.

The sound source direction detecting unit 13c is a signal processing unit which detects a direction of a sound source of the vehicle sound extracted by the vehicle sound extracting unit 12c. In addition to detecting the elevation angle of the sound source direction in Embodiment 1, the sound source direction detecting unit 13c detects whether or not the predetermined number of vehicles or more have not crossed in front of the vehicle equipped with the apparatus within a predetermined time period before presenting information on a vehicle-in-blind-spot. Here, the detection is conducted at each of: the pair of the sound collecting microphones (the sound collecting microphones 11d and 11e) mounted on the front left; and the other pair of the microphones (the sound collecting microphones 11f and 11g) mounted on the front right.

In order to detect whether or not the predetermined number of vehicles or more have not crossed in front of the vehicle equipped with the apparatus within the predetermined time period before presenting information on the vehicle-in-blind-spot, the sound source direction detecting unit 13c calculates the number of times at which a magnitude relation of the sound pressure levels of the vehicle sound has inverted (or the number of times at which a sign of the phase difference has inverted). Here, the vehicle sound is extracted for a predetermined time before presenting information on the vehicle-in-blind-spot (10 seconds immediately before, for example) at two of the sound collecting microphones (the sound collecting microphones 11d and 11f, for example) mounted on each of the front left and the front right of the vehicle equipped with the apparatus. In the case where the number of times at which the magnitude relation of the sound pressure levels has inverted is smaller than a predetermined number (a number indicating a predetermined number of vehicles), the case means that the number of vehicles having crossed in front of the vehicle equipped with the apparatus is not as many as the predetermined number of the vehicles within the predetermined time before presenting information on the vehicle-in-blind-spot. Here, the sound pressure levels represent a sound pressure level of the sound collecting microphone 11d mounted on the front left and a sound pressure level of the sound collecting microphone 11f mounted on the front right. Alternatively, the number of vehicles having crossed in front of the vehicle equipped with the apparatus is not as many as the predetermined number of the vehicles within the predetermined time before presenting information on the vehicle-in-blind-spot in the case where the number of times at which the sign of the phase difference has inverted is smaller than the predetermined number. Here, the phase difference is calculated by subtracting (i) a phase of the vehicle sound extracted at the sound collecting microphone 11f mounted on the front right from (ii) a phase of the vehicle sound extracted at the sound collecting microphone 11d mounted on the front left.

In addition to the functions of the vehicle-in-blind-spot determining unit 14 in Embodiment 1, the vehicle-in-blind-spot determining unit 14e includes a front crossing determining unit 28 determining whether or not a predetermined number of vehicles or more have not crossed in front of the vehicle equipped with the apparatus within a predetermined time period before presenting information on the vehicle-in-blind-spot. Specifically, the front crossing determining unit 28 controls and causes the presenting unit 15 to present information on a vehicle found in the blind spot in the case where the front crossing determining unit 28 determines that (i) the sound source direction of the vehicle sound is above (the first direction in Embodiment 1), and (ii) the predetermined number of vehicles or more have not crossed in front of the vehicle equipped with the apparatus within a predetermined time period before presenting information on the vehicle-in-blind-spot.

Described below is how the front crossing determining unit 28 determines whether or not the predetermined number of vehicles or more have not crossed in front of the vehicle equipped with the apparatus within the predetermined time period before presenting information on the vehicle-in-blind-spot. Specifically, the vehicle sound is extracted at two of the sound collecting microphones (the sound collecting microphones 11d and 11f, for example) mounted to each of the front left and the front right of the vehicle equipped with the apparatus. Then, the sound source direction detecting unit 13c calculates the number of times at which the magnitude relation of the sound pressure levels of the vehicle sound has inverted. The front crossing determining unit 28 then determines whether or not the inverted number is smaller than the predetermined number (the number indicating a predetermined number of vehicles). In the case where the inverted number is smaller than the predetermined number, the front crossing determining unit 28 determines that the number of vehicles having crossed in front of the vehicle equipped with the apparatus is not as many as the predetermined number of the vehicles within the predetermined time before presenting information on the vehicle-in-blind-spot. When the sound source direction detecting unit 13c calculates the phase difference of the vehicle sound extracted at two of the sound collecting microphones (the sound collecting microphones 11d and 11f, for example) mounted to each of the front left and the front right of the vehicle equipped with the apparatus, the front crossing determining unit 28 makes similar determination as made above in the case where the number of times at which the sign of the phase difference has inverted is greater than a predetermined number.

Described next is an operation of the vehicle-in-a-blind spot detecting apparatus 10e structured above in accordance with Embodiment 6.

FIG. 21 is a flow chart showing an operation in detecting the vehicle in the blind spot, using the vehicle-in-blind-spot detecting apparatus 10e. It is noted that the flow chart has a new step S34 inserted in the flow chart shown in Embodiment 1. The same processes as those in Embodiment 1 (S10 to S14) share the same numerical references, and thus the detailed description shall be omitted.

In Embodiment 6, upon confirming that the sound source direction of the vehicle sound is above (S13: Yes), the vehicle-in-blind-spot determining unit 14e subsequently determines whether or not the predetermined number of vehicles or more have not crossed in front of the vehicle equipped with the apparatus within the predetermined time period before presenting information on the vehicle-in-blind-spot (S34). Specifically, in the predetermined time before providing information on a vehicle-in-blind-spot, the front crossing determining unit 28 in the vehicle-in-blind-spot determining unit 14e determines whether or not the number of times, at which the magnitude relation of the sound pressure levels of the vehicle sound has inverted, is smaller than the predetermined number. Here, the sound source direction detecting unit 13c calculates the inverted number, and the vehicle sound is extracted at the two of the sound collecting microphones (the sound collecting microphones 11d and 11f, for example) mounted to each of the front left and the front right of the vehicle equipped with the apparatus.

As a result, when the front crossing determining unit 28 in the vehicle-in-blind-spot determining unit 14e determines that the number of times, at which the magnitude relation of the sound pressure levels of the vehicle sound has inverted, is smaller than the predetermined number (S34: No), the front crossing determining unit 28: determines that the number of vehicles having crossed in front of the vehicle equipped with the apparatus is not as many as the predetermined number of the vehicles within the predetermined time before presenting information on the vehicle-in-blind-spot; and delivers the presenting unit 15 information indicating another vehicle in the blind spot (S14). Here, the vehicle sound is extracted at the two of the sound collecting microphones (the sound collecting microphones 11d and 11f, for example) mounted to each of the front left and the front right of the vehicle equipped with the apparatus. When the front crossing determining unit 28 determines that the number of times is not smaller than the predetermined number (S34: Yes), the front crossing determining unit 28: determines that the number of vehicles having crossed in front of the vehicle equipped with the apparatus is equal to or greater than the predetermined number of the vehicles within the predetermined time before presenting information on the vehicle-in-blind-spot; and delivers no information on a vehicle-in-blind-spot.

It is noted that a presenting example of information appearing on the presenting unit 15 may be a message which reads, "Traffic is not busy. Still, another car is found in the blind spot" on a display monitor, or the presenting unit 15 may provide the message in a speech. The presenting unit 15 may display an image indicating a vehicle found in the blind spot at a relevant point (the blind intersection ahead) on the map, or may present any given combination of the above pieces of information.

Through the above processes, the presenting unit 15 tells the operator of the vehicle equipped with the vehicle-in-blind spot detecting apparatus 10e the fact that a vehicle-in-blind-spot is found (here, a vehicle-in-blind-spot is presented so that the operator of the vehicle equipped with the apparatus can see the vehicle-in-blind spot through the obstacle) as shown in a presenting example illustrated in FIG. 22 (B), in the case where the number of vehicles having crossed in front of the vehicle equipped with the apparatus is not as many as the predetermined number of the vehicles within the predetermined time before presenting information on the vehicle-in-blind-spot as shown in a situation illustrated in FIG. 22 (A). Concurrently, the presenting unit 15 presents no particular information on a vehicle-in-blind-spot as a presenting example illustrated in FIG. 22 (D), in the case where no event has occurred such that the number of vehicles having crossed in front of the vehicle equipped with the apparatus is not as many as the predetermined number of the vehicles within the predetermined time before presenting information on the vehicle-in-blind-spot (in other words, the cases where (i) no vehicle-in-blind-spot is detected, and (ii) the number of vehicles having crossed in front of the vehicle equipped with the apparatus is equal to or greater than the predetermined number of the vehicles within the predetermined time before presenting information on the vehicle-in-blind-spot even though a vehicle-in-blind-spot is found).

Thus, in extracting the vehicle sound, the vehicle-in-blind-spot detecting apparatus 10e in accordance with Embodiment 6 tells the operator of the vehicle equipped with the apparatus only in the cases where (i) the sound source direction of the vehicle-in-blind-spot is above, and (ii) the predetermined number of vehicles or more have not crossed in front of the vehicle equipped with the apparatus within a predetermined time period before presenting information on a vehicle-in-blind-spot; that is, the case where there is a possible risk of a traffic accident at a lightly-trafficked blind intersection.

It is noted that, in the Embodiment 6, the presenting unit 15 presents information only in the cases where (i) the sound source direction of the vehicle sound is above, and (ii) the predetermined number of vehicles or more have not crossed in front of the vehicle equipped with the apparatus within a predetermined time period before presenting information on a vehicle-in-blind-spot; concurrently, the presenting unit 15 presents a message which reads, "A vehicle-in-blind-spot is nearby" in the cases where (i) the sound source direction of the vehicle sound is above, and (ii) the predetermined number of vehicles or more have crossed in front of the vehicle equipped with the apparatus within a predetermined time period before presenting information on a vehicle-in-blind-spot.

Embodiment 7

Described next is Embodiment 7 of a vehicle-in-blind-spot detecting apparatus in accordance with the present invention.

In addition to the determination made on the vehicle-in-blind-spot in Embodiment 1 (the determination based on a direction vertical to the ground), Embodiment 7 is characterized in specifying to present a direction of the vehicle found on the road according to the vehicle's sound source direction horizontal to the ground.

Figure 23:
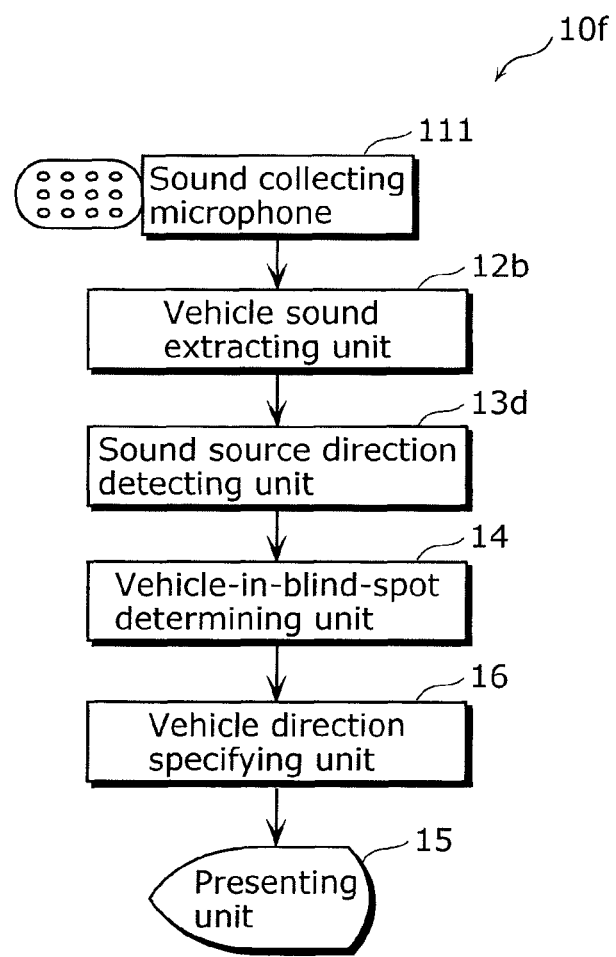
FIG. 23 is a functional block diagram illustrating a structure of a vehicle-in-blind-spot detecting apparatus in accordance with Embodiment 7 of the present invention.

FIG. 23 is a functional block diagram illustrating a structure of a vehicle-in-blind-spot detecting apparatus 10f in accordance with Embodiment 7. The vehicle-in-blind spot detecting apparatus 10f is capable of (i) specifying a sound source direction of a sound which is provided from the vehicle, and is horizontal to the ground, and (ii) presenting information on a direction of the vehicle found on the road to the operator. The vehicle-in-blind spot detecting apparatus 10f includes the sound collecting microphone 111, the vehicle sound extracting unit 12b, the sound source direction detecting unit 13d, the vehicle-in-blind-spot determining unit 14, a vehicle direction specifying unit 16, and the presenting unit 15. The structure of this vehicle-in-blind-spot detecting apparatus 10f is different from that of the vehicle-in-blind spot detecting apparatus 10d in accordance with Embodiment 5 in (i) replacing the sound source direction detecting unit 13b, and the vehicle-in-blind-spot determining unit 14d with the sound source direction detecting unit 13d and the vehicle-in-blind-spot determining unit 14 in accordance with Embodiment 1; respectively, and (ii) additionally having the vehicle direction specifying unit 16. The same structural elements described in Embodiment 5 share the same numerical references, and thus the detailed descriptions shall be omitted.

The sound source direction detecting unit 13d is a signal processing unit which detects a direction of a sound source of the vehicle sound extracted by the vehicle sound extracting unit 12b. In addition to detecting the elevation angle of the sound source direction in Embodiment 1, the sound source direction detecting unit 13d detects a sound source direction, of a vehicle sound, which is horizontal to the ground at each of a pair of microphones (the sound collecting microphones 11d and 11e) mounted on the front left, and another pair of microphones (the sound collecting microphones 11f and 11g) mounted on the front right.

Specifically, the sound source direction detecting unit 13d obtains the sound source direction out of the magnitude of sound pressure levels of the vehicle sound extracted at two of the sound collecting microphones (the sound collecting microphone 11d and 11f, for example) mounted on the front left and the front right of the vehicle equipped with the apparatus. Here, the sound source direction intends to be a direction of a sound collecting microphone having a greater sound pressure level of the extracted vehicle sound. In another example, the sound source direction detecting unit 13d can obtain a sound source direction, of a vehicle sound, which is horizontal to the ground out of (i) the phase difference (arrival time difference) of the vehicle sound extracted at two of the sound collecting microphones (the sound collecting microphone 11e and 11g, for example) mounted on the front left and the front right of the vehicle equipped with the apparatus, and (ii) the distance between the sound collecting microphones.

The vehicle direction specifying unit 16 causes the presenting unit 15 to present the sound source direction, of the vehicle sound, which is horizontal to the ground as a direction at which a vehicle providing the vehicle sound is found. The sound source direction which the presenting unit 15 presents is shown in either a numeric value, a graphic symbol indicating the direction, such as an arrow, or both of the numeric value and the graphic symbol. In the case where there are several sound source directions, of the vehicle sound, which are horizontal to the ground detected, the vehicle direction specifying unit 16 calculates an average direction among the detected several sound source directions, and causes the presenting unit 15 to present the calculated average direction as a direction at which the vehicle providing the vehicle sound is found.

Described next is an operation of the vehicle-in-blind spot detecting apparatus 10f structured above in accordance with Embodiment 7.

Figure 24:
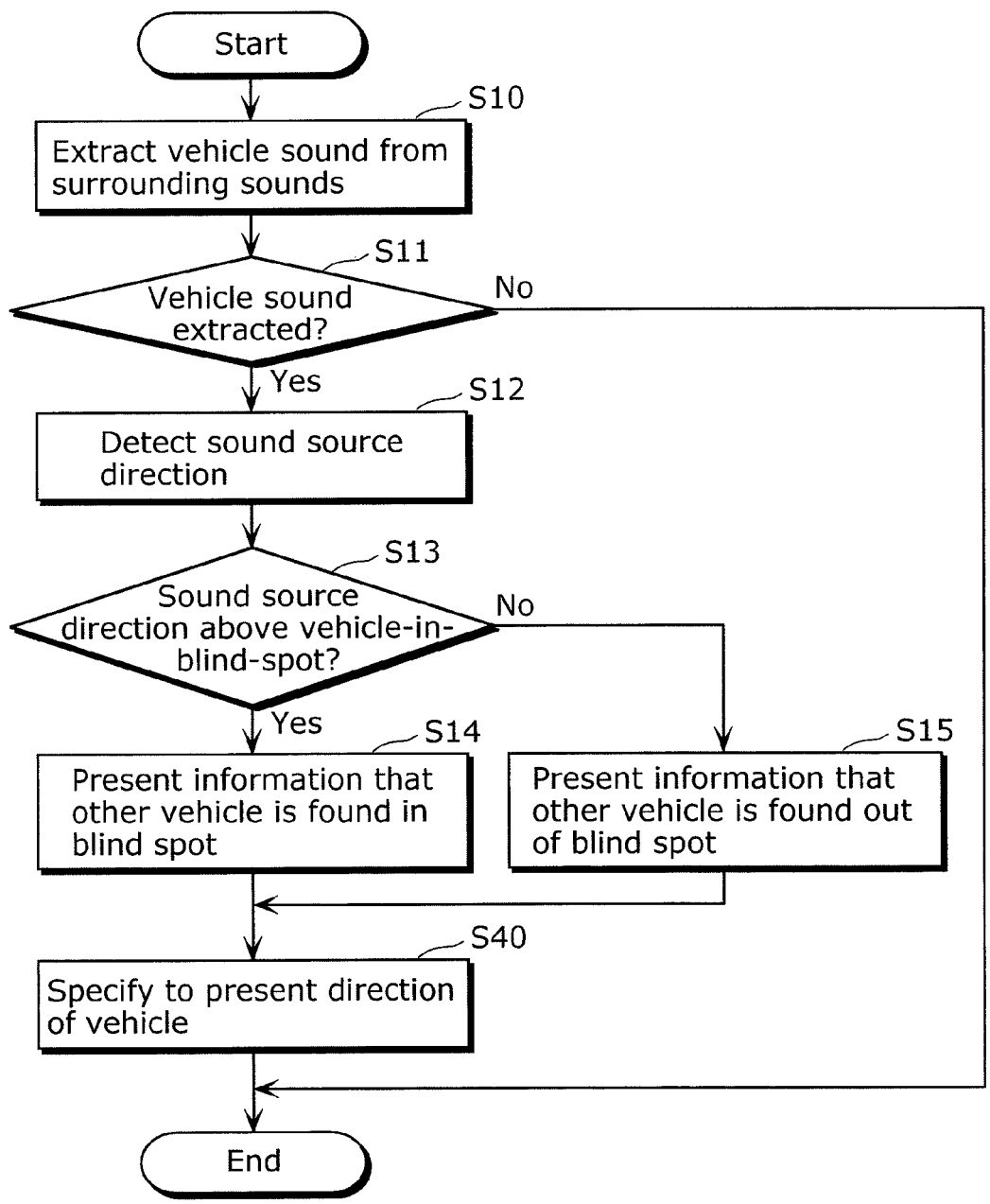
FIG. 24 is a flow chart showing an operation of the vehicle-in-blind-spot detecting apparatus in accordance with Embodiment 7.

FIG. 24 is a flow chart showing an operation in detecting the vehicle in the blind spot, using the vehicle-in-blind-spot detecting apparatus 10f. It is noted that the flow chart has a new step S40 inserted in the flow chart shown in Embodiment 1. The same processes as those in Embodiment 1 (S10 to S15) share the same numerical references, and thus the detailed description shall be omitted.

In Embodiment 7, when the vehicle-in-blind-spot determining unit 14 finishes determining a vehicle-in-blind-spot (S14 or S15), the vehicle direction specifying unit 16 provides the sound source direction, of the vehicle sound, which is horizontal to the ground as the direction at which a vehicle providing the vehicle sound is found (S40). Here, the sound source direction is detected by the sound source direction detecting unit 13. In the case where the sound source direction detecting unit 13d finds only one sound source direction, of the vehicle sound, which is horizontal to the ground, the vehicle direction specifying unit 16 provides the sound source direction as the direction at which the vehicle providing the vehicle sound is found. In the case where the sound source direction detecting unit 13d finds several sound source directions, of the vehicle sound, which are horizontal to the ground, the vehicle direction specifying unit 16 calculates an average direction among the several sound source directions, and presents the calculated average direction as the direction at which the vehicle generating the vehicle sound has been found.

Figures 25A, 25B:
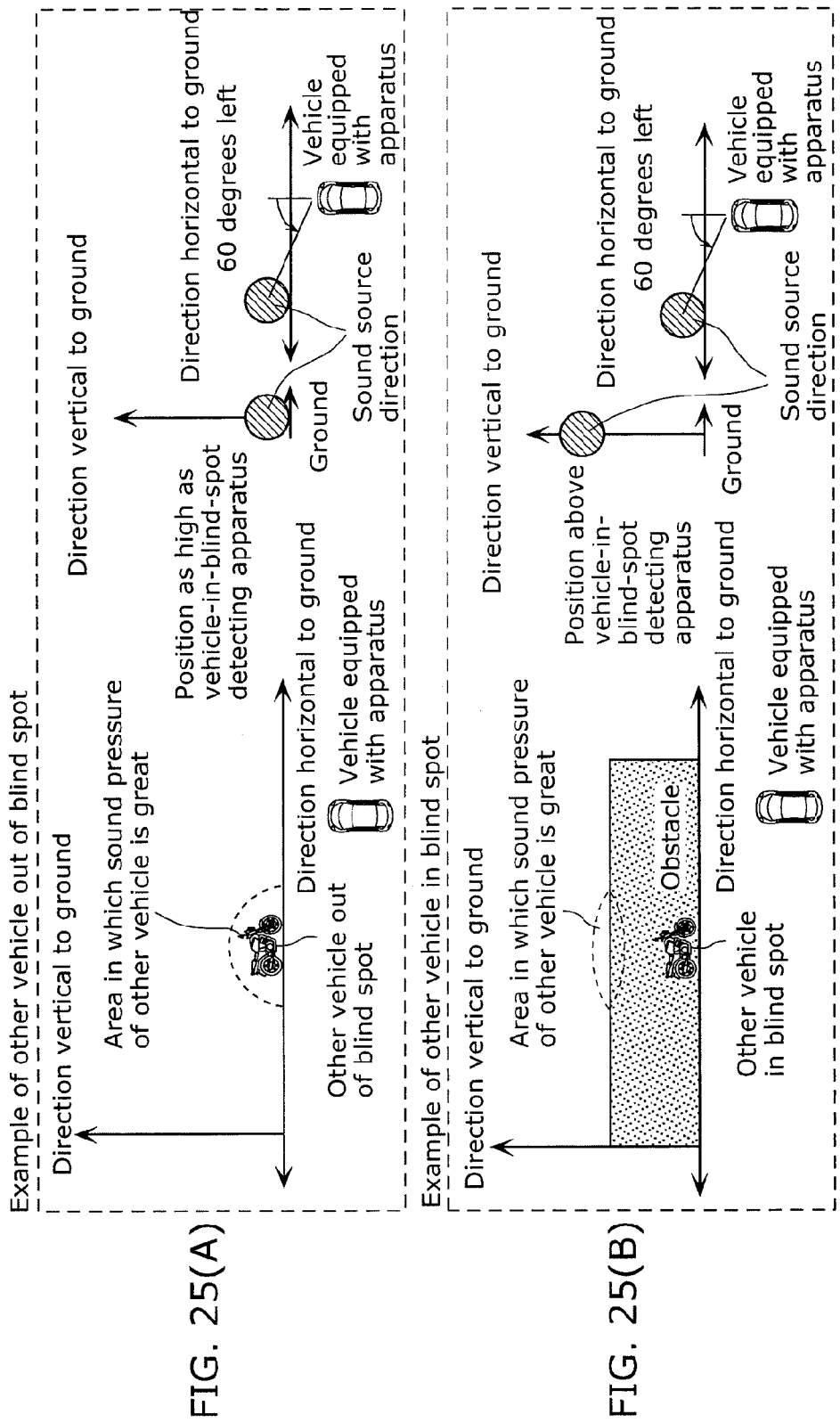
FIGS. 25 (A) and (B) illustrate examples, shown in Embodiment 7, of (i) positional relationship between a vehicle equipped with the apparatus and another vehicle, and (ii) a sound source direction of the vehicle sound generated by the other vehicle.

FIGS. 25 (A) and (B) illustrate examples, shown in Embodiment 7, of (i) positional relationship between the vehicle equipped with the apparatus and the other vehicle, and (ii) a sound source direction generated by the other vehicle. FIGS. 25 (A) and (B) exemplify the case where the sound source direction detecting unit 13d finds only one sound source direction, of the vehicle sound, which is horizontal to the ground. FIG. 25 (A) exemplifies the case where the other vehicle is found out of the blind spot. FIG. 25 (B) exemplifies the case where the other vehicle is found at the blind spot.

In the case where the other vehicle is found out of the blind spot, as shown in FIG. 25 (A), the sound source direction, of the other vehicle, which is vertical to the ground is as high as the vehicle equipped with the apparatus (the vehicle-in-blind-spot detecting apparatus). Thus, the vehicle-in-blind-spot determining unit 14 determines that the other vehicle is out of the blind spot (S13: No). In addition, the sound source direction, of the other vehicle, which is horizontal to the ground is the direction of 60 degrees left with respect to the vehicle equipped with the apparatus in this example. Thus, the vehicle direction specifying unit 16 specifies that the other vehicle is found at the direction of 60 degrees left, and the presenting unit 15 presents the direction (S40).

In the case where the other vehicle is found at the blind spot, as shown in FIG. 25 (B), the sound source direction, of the other vehicle, which is vertical to the ground is above the vehicle equipped with the apparatus (the vehicle-in-blind-spot detecting apparatus). Thus, the vehicle-in-blind-spot determining unit 14 determines that the other vehicle is at the blind spot (S13: Yes). In addition, the sound source direction, of the other vehicle, which is horizontal to the ground is the direction of 60 degrees left with respect to the vehicle equipped with the apparatus in this example. Thus, the vehicle direction specifying unit 16 specifies that the other vehicle is found at the direction of 60 degrees left, and the presenting unit 15 presents the direction (S40).

Figures 26A, 26B:
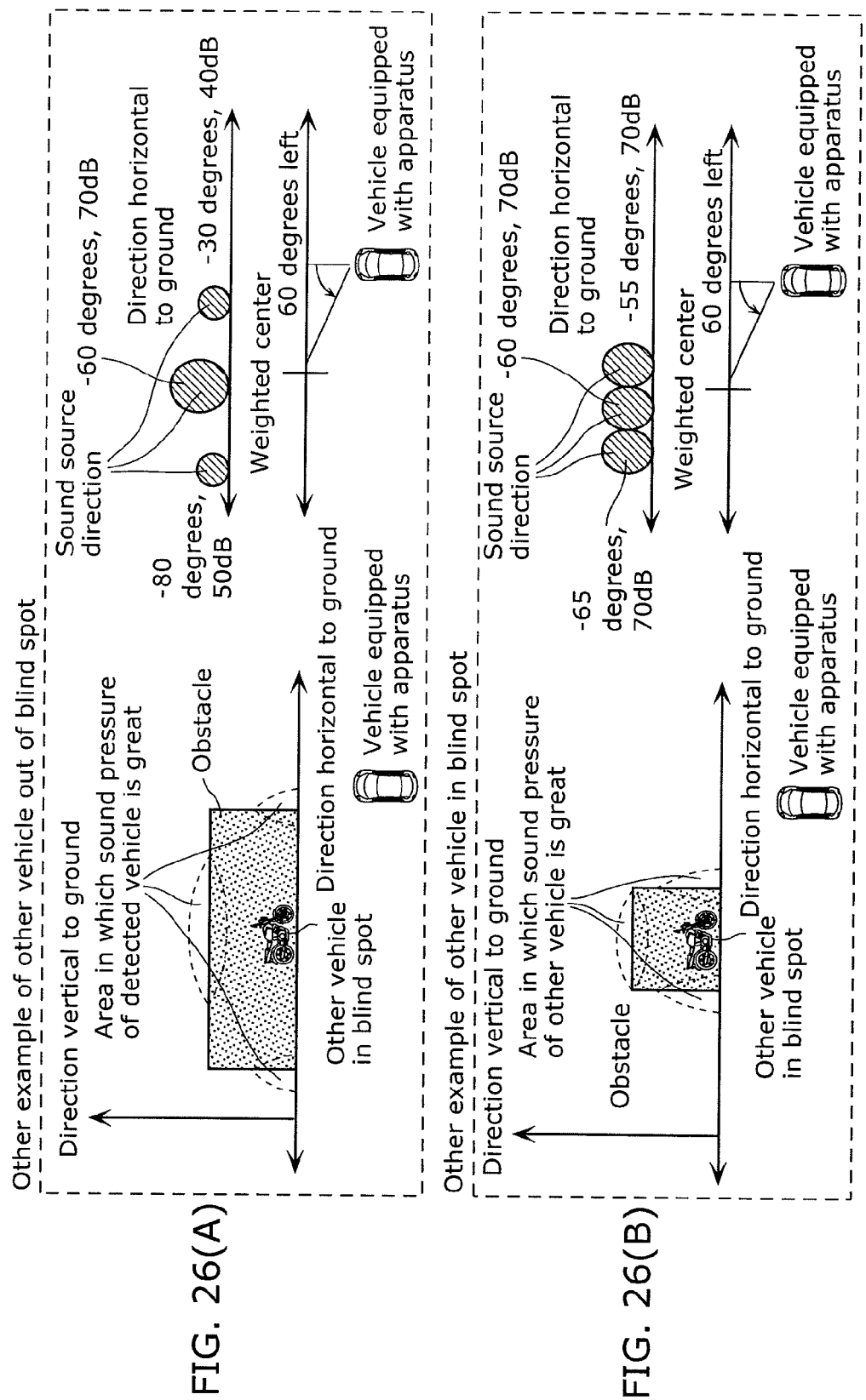
FIGS. 26 (A) and (B) illustrate examples, shown in Embodiment 7, of (i) another positional relationship between the vehicle equipped with the apparatus and the other vehicle, and (ii) a direction of a sound source of the vehicle sound generated by the other vehicle.

FIGS. 26 (A) and (B) illustrate other examples, shown in Embodiment 7, of (i) positional relationship between the vehicle equipped with the apparatus and the other vehicle, and (ii) a sound source direction, of the other vehicle. FIGS. 26 (A) and (B) exemplify the case where the sound source direction detecting unit 13*d* detects several sound source directions, of the vehicle sound, which are horizontal to the ground. FIG. 26 (A) exemplifies the case where the other vehicle is found at a blind spot behind a large obstacle, such as a private house. FIG. 26 (B) exemplifies the case where the other vehicle is found at a blind spot behind a small obstacle, such as a truck and a large car.

As shown in FIG. 26 (A), there are three sound source directions, of the other vehicle, which are horizontal to the ground. The three directions are, with respect to the vehicle equipped with the apparatus, 30 degrees left (the sound pressure is 40 dB), 60 degrees left (the sound pressure is 70 dB), and 80 degrees left (the sound pressure is 50 dB). Hence, the vehicle direction specifying unit 16 calculates an average direction among the three sound source directions. Here, the direction on the left is represented as a minus direction and the direction on the right as a plus direction. The average direction can be calculated using the following equation:

$$\frac{(-30) + (-60) + (-80)}{3} = -67 \qquad \text{[Expression 1]}$$

Here, the denominator represents the number of the sound source directions. In this example, the average direction is 67 degrees left. Thus, the vehicle direction specifying unit 16 specifies that the other vehicle is found at the direction of 67 degrees left, and the presenting unit 15 presents the direction (S40).

It is noted that the average direction may be calculated by weighing with a sound pressure. The weighted average direction can be calculated by the following equation:

$$\frac{40 \times (-30) + 70 \times (-60) + 50 \times (-80)}{40 + 70 + 50} = -59 \qquad \text{[Expression 2]}$$

Here, the denominator represents the total sum of the weighted numbers. In this example, the average direction is 59 degrees left. Thus, the vehicle direction specifying unit 16 specifies that the other vehicle is found at the direction of 59 degrees left, and the presenting unit 15 presents the direction (S40).

As shown in FIG. 26 (B), there are three sound source directions, of the other vehicle, which are horizontal to the ground. The three directions are, with respect to the vehicle equipped with the apparatus, 55 degrees left (the sound pressure is 70 dB), 60 degrees left (the sound pressure is 70 dB), and 65 degrees left (the sound pressure is 70 dB). Hence, the vehicle direction specifying unit 16 calculates an average direction among the three sound source directions. Here, the direction on the left is represented as a minus direction and the direction on the right as a plus direction. The average direction can be calculated by the following equation:

$$\frac{(-55) + (-60) + (-65)}{3} = -60 \qquad \text{[Expression 3]}$$

Here, the denominator represents the number of the sound source directions. In this example, the average direction is 60 degrees left. Thus, the vehicle direction specifying unit 16 specifies that the other vehicle is found at the direction of 60 degrees left, and the presenting unit 15 presents the direction (S40).

It is noted that the average direction may be calculated by weighing with a sound pressure. The weighted average direction can be calculated by the following equation:

$$\frac{70 \times (-55) + 70 \times (-60) + 50 \times (-65)}{70 + 70 + 70} = -60 \qquad \text{[Expression 4]}$$

Here, the denominator represents the total sum of the weighted numbers. In this example, the average direction is 60 degrees left. Thus, the vehicle direction specifying unit 16 specifies that the other vehicle is found at the direction of 60 degrees left, and the presenting unit 15 presents the direction (S40).

It is noted that a presenting example of information appearing on the presenting unit 15 may show the direction (position) of the other vehicle on the map of the car navigation display. The presenting unit 15 may provide the direction (position) of the other vehicle in a speech, or in a sound by localizing the vehicle sound of the other vehicle at a specified direction.

The above processes allow the operator of the vehicle equipped with vehicle-in-blind spot detecting apparatus 10*f* to detect in advance the direction at which the vehicle-in-blind-spot is approaching.

It is noted that Embodiment 7 involves determining the vehicle-in-blind-spot, followed by specifying the direction at which the vehicle has been found; concurrently, Embodiment 7 may invert the order and involve specifying the direction at which the vehicle has been found followed by determining the vehicle-in-blind-spot.

It is noted that Embodiment 7 involves presenting information on the other vehicle found either at blind spot, or out of the blind spot, followed by presenting the direction of the other vehicle; concurrently, such presentation may be executed simultaneously.

It is noted that the direction of the other vehicle may be presented only in the case where the other vehicle is found at the blind spot. In this case, the operator can receive detailed information on the other vehicle (the direction of the other vehicle) only in a dangerous case where a vehicle-in-blind-spot is found. Thus, the operator can concentrate on the operation when the other vehicle is found only out of the blind spot.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

For example, the vehicle direction specifying unit 16 in accordance with Embodiment 7 may be included in a vehicle-in-blind-spot detecting apparatus in any one of Embodiments 1 to 7.

Further, the vehicle-in-blind-spot detecting apparatus in Embodiments 1 to 7 is mounted on a vehicle; concurrently, the vehicle-in-blind-spot detecting apparatus in accordance with an implementation of the present invention may be stationary and installed at a roadside before the intersection. This makes possible informing a vehicle approaching the intersection of the fact that there is a vehicle-in-blind-spot on the road across the intersection ahead.

An aspect of the present invention can be used as either a vehicle-mounted apparatus for detecting a vehicle-in-blind-spot, or a vehicle-in-blind-spot detecting apparatus installed on a roadside. In particular, the aspect of the present invention can be used as a stand-alone apparatus which makes possible detecting a vehicle-in-blind-spot without communicating with another apparatus.

What is claimed is:

1. A vehicle-in-blind-spot detecting apparatus mounted on a vehicle which detects another vehicle positioned in a blind spot, the vehicle-in-blind-spot detecting apparatus comprising:
    a presenting unit configured to present information;
    at least one microphone which detects a sound;
    a vehicle sound extracting unit configured to extract a vehicle sound of the other vehicle from the sound detected by the microphone;
    a sound source direction detecting unit configured to detect a sound source direction of the vehicle sound extracted by the vehicle sound extracting unit; and
    a vehicle-in-blind-spot determining unit configured to cause the presenting unit to present the information, the information indicating that a the other vehicle is found in a blind spot based on the sound source direction of the vehicle sound detected by the sound source direction detecting unit, which is a first direction representing a direction above the vehicle with the vehicle-in-blind-spot detecting apparatus with respect to ground level,
    wherein the first direction has an elevation angle with respect to the vehicle with the vehicle-in-blind-spot detecting apparatus that is greater than 0 degrees.

2. The vehicle-in-blind-spot detecting apparatus according to claim 1,
    wherein the microphone includes a first microphone and a second microphone which are mounted with a certain distance apart on the vehicle in a vertical direction, the vehicle being equipped with the vehicle-in-blind-spot detecting apparatus,
    the vehicle sound extracting unit is configured to extract each of vehicle sounds from sounds detected by respective the first microphone and the second microphone,
    the sound source direction detecting unit is configured to detect one of a ratio of sound pressure levels and a phase difference between the vehicle sounds which are (i) detected by the first microphone and the second microphone, and (ii) extracted by the vehicle sound extracting unit, and
    the vehicle-in-blind-spot determining unit is configured to (i) determine whether or not one of the ratio of the sound pressure levels and the phase difference is greater than a predetermined threshold value, and
    in the case where one of the ratio of the sound pressure levels and the phase difference is greater than the predetermined threshold value, (ii) determine that the sound source direction is at the first direction, and (iii) cause the presenting unit to present the information, the ratio of the sound pressure levels and the phase difference representing a ratio of the sound pressure levels and a phase difference of (i) the vehicle sound detected by the first microphone mounted above in the vertical direction to (ii) the vehicle sound detected by the second microphone mounted below in the vertical direction.

3. The vehicle-in-blind-spot detecting apparatus according to claim 1,
    wherein the vehicle-in-blind-spot determining unit is further configured to (i) determine whether or not the sound source direction of the vehicle sound has changed from the first direction to a second direction which is horizontal to the ground level, and, in the case of determining that the sound source direction has changed from the first direction to the second direction, (ii) cause the presenting unit to present information for raising caution to an operator of the vehicle equipped with the vehicle-in-blind-spot detecting apparatus, the sound source direction being detected by the sound source direction detecting unit.

4. The vehicle-in-blind-spot detecting apparatus according to claim 3,
    wherein the microphone includes a first microphone and a second microphone which are mounted with a certain distance apart on a vehicle in a vertical direction, the vehicle being equipped with the vehicle-in-blind-spot detecting apparatus,
    the vehicle sound extracting unit is configured to extract each of vehicle sounds from sounds detected respectively by the first microphone and the second microphone,
    the sound source direction detecting unit is configured to detect one of a ratio of sound pressure levels and a phase difference which is observed between the vehicle sounds which are (i) detected by the first microphone and the second microphone, and (ii) extracted by the vehicle sound extracting unit, and
    the vehicle-in-blind-spot determining unit is configured to (i) determine whether or not one of the ratio of the sound pressure levels and the phase difference has changed from a value larger than a predetermined threshold value to a value smaller than the predetermined threshold value, and
    in the case where one of the ratio of the sound pressure levels and the phase difference has changed from a value larger than the predetermined threshold value to a value smaller than the predetermined threshold value, (ii) determine that the sound source direction has changed from the first direction to the second direction, and (iii) cause the presenting unit to present the information, the ratio of the sound pressure levels and the phase difference representing a ratio of the sound pressure levels and a phase difference of (i) the vehicle sound detected by the first microphone mounted above in the vertical direction to (ii) the vehicle sound detected by the second microphone mounted below in the vertical direction.

5. The vehicle-in-blind-spot detecting apparatus according to claim 3,
    wherein the vehicle-in-blind-spot determining unit is further configured to (i) determine whether or not an intersection located toward the sound source direction has one of a blinking traffic light and a stop sign when the sound source direction has changed from the first direction to the second direction, and
    in the case where the intersection located toward the sound source direction has one of the blinking traffic light and the stop sign, (ii) cause the presenting unit to present information on raising caution to the operator of the vehicle equipped with the vehicle-in-blind-spot detecting apparatus.

6. The vehicle-in-blind-spot detecting apparatus according to claim 1,
wherein the vehicle-in-blind-spot determining unit is further configured to (i) determine whether or not the sound source direction is a direction indicating ahead of a vehicle equipped with the vehicle-in-blind-spot detecting apparatus, and
in the case where the sound source direction is the first direction and the direction indicating ahead of the vehicle, (ii) cause the presenting unit to present the information indicating that a vehicle is found in a blind spot.

7. The vehicle-in-blind-spot detecting apparatus according to claim 6,
wherein the microphone includes a first microphone, a second microphone, and a third microphone, the first microphone and the second microphone being mounted with a certain distance apart on the vehicle equipped with the vehicle-in-blind-spot detecting apparatus in a vertical direction, and the third microphone being mounted on the vehicle behind the first microphone and the second microphone,
the vehicle sound extracting unit is configured to extract each of vehicle sounds from sounds detected respectively by the first microphone, the second microphone, and the third microphone,
the sound source direction detecting unit is configured to detect (i) one of a ratio of sound pressure levels and a phase difference which is observed between the vehicle sounds which are detected by the first microphone and the second microphone, and extracted by the vehicle sound extracting unit, and (ii) one of an other ratio of sound pressure levels and an other phase difference which is observed between the vehicle sounds which are detected by (i) either the first microphone or the second microphone, and (ii) the third microphone, and
the vehicle-in-blind-spot determining unit is configured to (i) determine whether or not one of the ratio of the sound pressure levels and the phase difference is greater than a predetermined threshold value, the ratio of the sound pressure levels and the phase difference representing a ratio of the sound pressure levels and a phase difference of (a) the vehicle sound detected by the first microphone mounted above in the vertical direction to (b) the vehicle sound detected by the second microphone mounted below in the vertical direction, (ii) determine whether or not one of the other ratio of the sound pressure levels and the other phase difference is greater than a predetermined threshold value,
the other ratio of the sound pressure levels and the other phase difference representing a ratio of the sound pressure levels and a phase difference of the vehicle sounds between (a) either the first microphone or the second microphone, and (b) the third microphone, and
when both of the determinations show affirmatives, (iii) determine that the sound source direction is the first direction and is the direction indicating ahead of the vehicle.

8. The vehicle-in-blind-spot detecting apparatus according to claim 1,
wherein the vehicle-in-blind-spot determining unit is further configured to (i) determine whether or not the sound source direction, found ahead of a vehicle equipped with the vehicle-in-blind-spot detecting apparatus, has changed either from left to front or from right to front on the vehicle, and
in the case of determining that the sound source direction is the first direction and has changed has changed either from the left to the front or from the right to the front, (ii) cause the presenting unit to present the information indicating that a vehicle is found in a blind spot.

9. The vehicle-in-blind-spot detecting apparatus according to claim 8,
wherein the microphone includes pairs of microphones, each pair (i) being mounted to left and right of the vehicle equipped with the vehicle-in-blind-spot detecting apparatus, and (ii) having two microphones mounted with a certain distance apart in a vertical direction,
the vehicle sound extracting unit is configured to extract each of vehicle sounds from sounds detected by two pairs of the microphones included in the pairs of microphones, each pair being mounted to the left and the right of the vehicle equipped with the vehicle-in-blind-spot detecting apparatus,
the sound source direction detecting unit is configured to detect one of a ratio of sound pressure levels and a phase difference which is observed between the vehicle sounds detected by the two microphones included in at least one of the two pairs of microphones, and
the vehicle-in-blind-spot determining unit is configured to (i) determine whether or not one of the ratio of the sound pressure levels and the phase difference is greater than a predetermined threshold value, the ratio of the sound pressure levels and the phase difference representing a ratio of the sound pressure levels and a phase difference of (a) the vehicle sound detected by one of the two microphones, in the pair, which is mounted above in the vertical direction to (b) the vehicle sound detected by an other one of the two microphones, in the pair, which is mounted below in the vertical direction, (ii) determine whether or not one of the ratio of the sound pressure levels and the phase difference, observed at one of the microphones included in the pair to the left and at one of the microphones included in the pair to the right, is approaching 1 or 0 degrees with time, and
when the one of the ratio of the sound pressure levels and the phase difference obtained by either the above microphone or the below microphone is greater than a predetermined threshold value, and one of the ratio of the sound pressure levels and the phase difference obtained by the microphone on the left and the microphone on the right is approaching 1 or 0 degrees with time, (iii) determine that the sound source direction is the first direction and the direction indicating ahead of the vehicle.

10. The vehicle-in-blind-spot detecting apparatus according to claim 1,
wherein the vehicle-in-blind-spot determining unit is further configured to (i) determine a predetermined number of vehicles or more have not crossed in front of the vehicle equipped with the apparatus within a predetermined time period before presenting the information, and
when the sound source direction is the first direction and the vehicle-in-blind-spot determining unit has determined that the predetermined number of vehicles or more have not crossed in front of the vehicle equipped with the apparatus within a predetermined time period, (ii) cause the presenting unit to present the information indicating that a vehicle is found in a blind spot.

11. The vehicle-in-blind-spot detecting apparatus according to claim 10,
wherein the microphone includes pairs of microphones, each pair (i) being mounted to left and right of the vehicle equipped with the vehicle-in-blind-spot detecting apparatus, and (ii) having two microphones mounted with a certain distance apart in a vertical direction, the vehicle sound extracting unit is configured to extract each of vehicle sounds from sounds detected by two pairs of microphones, included in the pairs of microphones, mounted to each of the left and the right of the vehicle, the sound source direction detecting unit is configured to detect one of a ratio of sound pressure levels and a phase difference which is observed between the vehicle sounds which are detected by at least one of the two pairs of the microphones, and the vehicle-in-blind-spot determining unit is configured to (i) determine whether or not one of the ratio of the sound pressure levels and the phase difference is greater than a predetermined threshold value, the ratio of the sound pressure levels and the phase difference representing a ratio of the sound pressure levels and a phase difference of (a) the vehicle sound detected by one of the two microphones, in the pair, which is mounted above in the vertical direction to (b) the vehicle sound detected by an other one of the two microphones, in the pair, which is mounted below in the vertical direction, (ii) determine, within a predetermined time period before presenting the information, whether or not one of (a) a magnitude relation of the sound pressure levels, and (b) the number of times at which a sign of the phase difference has inverted is smaller with time than a predetermined threshold value, the one of the ratio of the sound pressure levels and the phase difference being detected by one of the two microphones included in the pair to the left and by one of the two microphones included in the pair to the right, and when the one of the ratio of the sound pressure levels and the phase difference detected by either the above microphone or the below microphone is greater than a predetermined threshold value, and the one of (a) the magnitude relation of the sound pressure levels and (b) the number of times at which a sign of the phase difference has inverted is smaller with time than the predetermined threshold value, the one of the ratio of the sound pressure levels and the phase difference being detected by the microphone to the left and the microphone to the right, (iii) determine that the sound source direction is the first direction, and the predetermined number of vehicles or more have not crossed in front of the vehicle equipped with the apparatus within the predetermined time period.

12. The vehicle-in-blind-spot detecting apparatus according to claim 1, further comprising a vehicle direction specifying unit configured to cause the presenting unit to present information on a sound source direction horizontal to the ground level as a direction at which a vehicle generating the vehicle sound is found, the sound source direction being included in the sound source direction detected by the sound source direction detecting unit.

13. The vehicle-in-blind-spot detecting apparatus according to claim 12, wherein, in the case where the sound source direction detecting unit finds several sound source directions horizontal to the ground level, the vehicle direction specifying unit is configured to calculate an average direction among the several sound source directions, and cause the presenting unit to present the calculated average direction as the direction at which the vehicle generating the vehicle sound has been found.

14. A method of determining another vehicle is positioned in a blind spot, the method being executed by a vehicle-in-blind-spot detecting apparatus mounted on a vehicle, the vehicle-in-blind-spot detecting apparatus including a presenting unit which presents information and at least one microphone which detects a sound, the method comprising:

extracting a vehicle sound of the other vehicle from the sound detected by the microphone;

detecting a sound source direction of the vehicle sound extracted; and causing the presenting unit to present the information, the information indicating that flail the other vehicle is found in a blind spot based on the sound source direction of the vehicle sound detected, which is a first direction representing a direction above the vehicle with the vehicle-in-blind-spot detecting apparatus with respect to ground level, wherein the first direction has an elevation angle with respect to the vehicle with the vehicle-in-blind-spot detecting apparatus that is greater than 0 degrees.

15. A non-transitory computer-readable recording medium storing a program for a vehicle-in-blind-spot detecting apparatus which detects the other vehicle positioned in a blind spot, and which causes a computer to execute the steps included in the method according to claim 14.

* * * * *